(12) United States Patent
Venkataraman

(10) Patent No.: US 11,075,892 B2
(45) Date of Patent: Jul. 27, 2021

(54) FULLY CLOAKED NETWORK COMMUNICATION MODEL FOR REMEDIATION OF TRAFFIC ANALYSIS BASED NETWORK ATTACKS

(71) Applicant: COLORTOKENS, INC., Santa Clara, CA (US)

(72) Inventor: Natarajan Venkataraman, Bangalore (IN)

(73) Assignee: COLORTOKENS, INC., Santa Clara, CA (US)

(*) Notice: Subject to any disclaimer, the term of this patent is extended or adjusted under 35 U.S.C. 154(b) by 314 days.

(21) Appl. No.: 16/360,700

(22) Filed: Mar. 21, 2019

(65) Prior Publication Data

US 2020/0304477 A1 Sep. 24, 2020

(51) Int. Cl.
*H04L 29/06* (2006.01)
*H04L 12/761* (2013.01)
*H04L 9/14* (2006.01)
*H04L 29/08* (2006.01)
*H04L 12/44* (2006.01)

(52) U.S. Cl.
CPC ............ *H04L 63/0464* (2013.01); *H04L 9/14* (2013.01); *H04L 45/16* (2013.01); *H04L 63/0236* (2013.01); *H04L 63/0272* (2013.01); *H04L 12/44* (2013.01); *H04L 67/104* (2013.01)

(58) Field of Classification Search
CPC ............ H04L 63/0272; H04L 63/0464; H04L 63/0236; H04L 9/14; H04L 45/16; H04L 67/104; H04L 63/0435; H04L 2209/76
See application file for complete search history.

(56) References Cited

U.S. PATENT DOCUMENTS

| | | | |
|---|---|---|---|
| 2011/0093698 A1* | 4/2011 | Blom ................... | H04L 65/601 713/153 |
| 2017/0142096 A1* | 5/2017 | Reddy ................. | H04L 63/0414 |
| 2018/0351757 A1* | 12/2018 | Reddy ................. | H04L 63/0457 |

* cited by examiner

*Primary Examiner* — Mohammad A Siddiqi
(74) *Attorney, Agent, or Firm* — Barry Choobin; Patent 360LLC

(57) ABSTRACT

A point-to-point Virtual Private Network (VPN) tunnel is established for facilitating fully cloaked transmission of a data packet from a source endpoint device to a destination endpoint device. The data packet includes a payload portion, an inner header, and an outer header. An 'end-to-end key', a 'next-hop-destination key' and a plurality of 'next-hop' keys are calculated. The end-to-end key is used at the source endpoint device and the destination endpoint device respectively to encrypt and decrypt the payload portion. The next-hop keys are used to encrypt the inner header during the hop-to-hop communication from one intermediary node to another, along the incrementally constructed path connecting the source endpoint device with the destination endpoint device. The encryption of the payload portion is maintained throughout the hop-to-hop communication regardless of the number of intermediary nodes traversed by the data packet en route to the destination endpoint device.

17 Claims, 4 Drawing Sheets

FULLY CLOAKED NETWORK COMMUNICATION MODEL FOR REMEDIATION OF TRAFFIC ANALYSIS BASED NETWORK ATTACKS

BACKGROUND

Technical Field

The present disclosure relates to network-oriented data communication. Particularly, the present disclosure relates to data communication via a communication network arranged using a hub-spoke topography. More particularly, the present disclosure relates to methods, apparatus and computer program products that facilitate secured spoke to spoke communication across a hub-spoke communication network.

Description of Related Art

Peer-to-peer (P2P) networks are typically used to promote an increase in the ease with which information stored across a computer network could be accessed and processed. Historically, P2P network models have incorporated an operational philosophy largely independent of the presence and the functionalities of centralized control points (i.e., server systems). P2P network models help reduce the load on the server systems by enabling the peers (computer-based devices communicating with one another across a computer network) to bypass the server for certain activities including information gathering, file transfer, and sharing of predetermined resources, thereby enabling the server systems to concentrate solely on the services genuinely requiring continued access to the computing resources available only within the server environment. P2P networks often considered as an improvement over the conventional client-server architecture operated outside the Domain Name System— more so whenever P2P networks are operated on the internet—thereby functioning independently of the underlying client-server architecture. However, operating independent of traditional server systems and outside the (traditional) Domain Name System rendered the P2P networks vulnerable to certain security related risks including but not restricted to peer poisoning, privacy-related security risks, and user-identity related security risks.

Typically, in conventional P2P networks, a data stream (information) emanating from a particular computer-based device (a peer computer) may be compromised by other peer computers assisting in the transmission of the said data stream. Typically, when the data stream is transmitted across a plurality of peer computers, each of the transmitting peers would inevitably have direct access to the data packets. Encryption of the data packets notwithstanding, a network attacker having access to any of the transmitting peers could infer at least the type of information transmitted via the data packets, the source and the intended destination of each of the data packets, and subsequently use the inferred information to identify a communication pattern characterizing the corresponding P2P network. The data privacy-related issues described above and the consequential security risks are exacerbated by the fact that conventional P2P networks continue to encourage and facilitate open sharing of data files via multiple peer computers irrespective of the sensitivity of the information incorporated therein, all the while keeping the end-users (sender and recipient of the data stream) as well as the users of other peer computers assisting in transmission of said data stream, in the dark, rather unwittingly, about the sensitivity of the shared data files.

Further, conventional P2P based file sharing platforms are known to offer end-users several advantages including comparatively better download speeds and access to a comparatively large information base. However, despite the aforementioned advantages, P2P based file sharing applications are also known to pose serious privacy implications and consequential security-related risks since every file-sharing platform based on the P2P network model is typically open for anyone to participate in, and the data received from any given P2P based file sharing platform is downloaded from other peer computers whose identity and trustworthiness are at the best unknown and questionable. Additionally, the ease-of-use typically associated with P2P networks and especially the P2P based file sharing platforms often overshadows the larger privacy implications and security risks, and often tricks, rather unwittingly, the end-users into ignoring the privacy implications and the consequential security risks while sharing sensitive data using conventional P2P based file sharing platforms, notwithstanding the likely possibility that the sensitive data is transmitted through multiple peer computers whose identities and trustworthiness are at best unknown and questionable.

Conventional P2P networks, given their construction and network characteristics, deviate significantly from preserving the users' identities and maintaining the confidentiality of the transmitted data, and consequentially trigger revelation of at least the IP address of each of the peer computers during, for example, a download operation or a data transfer operation. Such a revelation of the IP address of the (corresponding) peer computers, in turn, allows each of the peer computers to be aware of not only the identities of the (other) remaining peer computers but also of the type of information being shared and downloaded by the (other) remaining peer computers. Further, it is also possible that once the identity of a peer computer is compromised, further network attacks are easily directed to the said peer computer—given the fact that the IP address of said peer computer is revealed to every other peer computer participating in the P2P network. In order to overcome at least the (aforementioned) disadvantages of the conventional P2P networks, protected (point-to-point) Virtual Private Network (VPN) tunnels which allowed peers to communicate with one another in a secured manner notwithstanding the privacy-related security risks and user-identity related security risks, were introduced. Protected VPN tunnels rely on the phenomenon of cryptography (encryption and encapsulation) and anonymity to hide their identities and to protect them, and the data exchanged therethrough, from technical network attacks.

Preferably, protected VPN tunnels which were typically overlaid on conventional TCP/IP networks are regarded as a secured alternative to the conventional TCP/IP networks since they (the protected VPN tunnels) provided for secured transmission of data amongst the peer computers and obviated the security risks and the data privacy issues commonly associated with the conventional P2P networks and the TCP/IP network that typically provided interconnectivity between the peer computers constituting conventional P2P networks. Typically, the use of a protected VPN tunnel for facilitating the exchange of data between two peer computers provides for the data stream to be divided into several data packets and for each data packet to be encapsulated prior to being transmitted via the VPN tunnel. Typically, the data packets encapsulated as described above necessitate the use of specific decryption keys for decryption of the encapsulated data packet, with the absence of such predetermined decryption keys rendering the data packets non-accessible. While a protected VPN tunnel facilitates secured data exchange between (at least) two peer computers, and while the use of VPN tunnels across a P2P network model rendered the otherwise unsecured P2P network model comparatively safer and secured for data transmission, the construction and implementation of VPN tunnels also makes them susceptible to certain security risks including VPN hijacks and man-in-the-middle attacks.

Since the fact that the decryption keys necessary for decrypting a data packet transmitted via a protected VPN network tunnel are well protected and therefore rendered inaccessible to unauthorized users (for example, a network attacker), it is probable that the network attacker contemplating an attack on the (data packets transmitted through) protected VPN tunnel decides to reduce the anonymity associated with the protected VPN tunnel, by launching a network traffic analysis attack on any of the nodes connected by the VPN tunnel—thereby rendering the VPN tunnel increasingly susceptible to traditional network attacks—rather than trying to clandestinely access and decrypt the data packets transmitted via the protected VPN tunnel. Shifting the focus from trying to clandestinely decrypt the data packets using decryption keys obtained as a consequence of unauthorised access, towards reducing the anonymity of the protected VPN tunnel transmitting the data packets, enables a network attacker to work around the security-related advantages associated with encrypted communications and the protected VPN tunnels and apply an attack on the protected VPN tunnel and in turn the underlying P2P network.

Typically, while a VPN tunnel diligently secures the data packets (and consequentially the data stream) transmitted from one peer computer to another, by encrypting a payload portion of the data packet (in a data packet, the payload portion incorporates the data to be transmitted), by leaving the header portion of the data packet unencrypted and easily accessible in comparison to the payload portion of the data packet, the VPN tunnel facilitates, rather unwittingly, an inference of at least the tunnel endpoints as well as the timing and the size of the transmitted data packets. Information inferred about the tunnel endpoints, and the timing and the size of the transmitted data packet acts as a blueprint for tracking the movement of data packet transmitted across the protected VPN tunnel—despite the data incorporated within the payload portion (of the data packet) remaining protected against unauthorized access, as long as the integrity of a corresponding decryption key is not compromised. The analysis of the movement of the data packet across the endpoints (of the protected VPN tunnel) provides a starting point for a network attacker to infer and subsequently analyze a pattern and timing of communication between the (tunnel) endpoints. Using the pattern and timing of communication as a starting point, it is possible that the network attacker successfully infers the 'path' likely to have been traversed by the data packet and consequentially the likely 'destination' of the data packet, and (any) intermediary nodes traversed by the data packet on the way to the destination. Further, the attacker may use the information inferred using the phenomenon of traffic analysis—i.e. the information about the source, destination, size and timing of the data packet—to launch an attack, for example, a denial of service attack to negatively affect the throughput and efficiency of the protected VPN tunnels and in turn the underlying P2P network.

In order to defend against traffic analysis attacks and the consequential reduction in the anonymity of an otherwise anonymous network, prior-art solutions envisaged disrupting statistical traffic analysis by routing the data packets to several randomly selected link nodes of an anonymous network. Routing of data packets via several randomly selected link nodes meant that no amount of snooping on a single link node provided (any) information on the designated destination (node) of the data packets, thereby preventing any technical attacks directed at the destination node. Further, the prior-art solutions envisaged a randomized circuitous data path (from a source node to a destination node) traversing multiple, randomly selected link nodes, as an effective alternative to a pre-designated/pre-defined direct data path incorporating pre-selected link nodes, thereby ensuring that no attacker attacking a single link node at any point of time could infer neither the likely destination node (for the data packet) nor the next intermediate node (on the data path of the data packet). In this manner, the prior-art solutions attempted to create a private, randomized, circuitous data path constituting randomly selected link nodes for interconnecting a source node and a destination node.

Typically, creating the randomized, circuitous data path by way of adding one link node at a time to the said data path, ensured that each link node constituted within the said data path is informed only about a preceding intermediate link node that transmitted the data packet and nothing more. In this manner, the prior-art solutions attempted to ensure that no link node is informed about the entire data path of a data packet. In this manner, the prior-art solutions also attempted to prevent traffic analysis of (any) intermediate link nodes from yielding information indicative of a communication pattern corresponding to the transmission of the data packets across an anonymous communication network and thereby consequentially circumvent any attempts by a network attacker to reduce the anonymity of the anonymous communication network. However, the advantages associated with the creation and the use of the randomized, circuitous data path vis-á-vis the use of conventional, pre-designated direct data paths, were largely offset by the drawbacks associated with the encryption policies implemented by the prior-art solutions.

Typically, the prior-art solutions envisaged encrypting the data packets transmitted on the said private (randomized, circuitous) data path, such that the data embedded within the payload portion of the data packets remained secure from network attacks. Typically, the prior-art solutions implemented two well-known data encryption policies for securing the data embedded within the data packets. The implementation of the first data encryption policy involved separating a data packet into a payload portion and non-payload portion and encrypting only the payload portion of the data packet using a predetermined encryption key while leaving the non-payload portion of the data packet unencrypted. However, the disadvantage associated with encrypting only the payload portion of the data packet while maintaining the header portion in an unencrypted format was that unencrypted header portion still remained susceptible to and defenseless against a traffic-analysis attack.

During the course of implementation of the first data encryption policy, by the prior-art solutions, on a data packet transmitted from the source node to the destination node, since only the payload portion of the data packet was encrypted, any intermediate link node, despite the selection of the intermediate link node being random and just-in-time, is informed about the contents (i.e., the source, destination, size, and timing) of the header portion of the data packet.

And it is possible that a network attacker could snoop on the un-encrypted, unprotected header portion of the data packet and use the information embedded therein to deduce a communication pattern corresponding to an otherwise anonymous interconnection between the source node and the destination node. While the prior-art solutions envisaged randomizing the selection of intermediate link nodes, so as to make it nearly impossible for a network attacker to infer the final destination of the data packet, based on the information embedded in the header portion, such a proposal, despite corresponding randomness and unpredictability, still leaves a decent amount of critical data (the data embedded in the header portion of a data packet) accessible to a network attacker.

Further, the implementation of the second data encryption policy by the prior-art solutions involved encapsulating the entire data packet (i.e., the header portion of a data packet as well as the payload portion of the data packet) within an outer packet and encrypting the outer packet using a predetermined encryption key. However, the encapsulation of the data packet within the outer packet, while ignoring the network scalability issues, also brings about a substantial decrease in the network throughput, since every intermediary link node receiving the encapsulated data packet would have to decrypt the entire data packet, i.e., the header portion as well as the payload portion, in order to identify a next-hop node for the data packet, and subsequently re-encrypt the data packet before transmitting the data packet to the identified next-hop node. Therefore, in view of the drawbacks associated with the encryption policies implemented by prior-art data communication solutions, and in further view of the security-related vulnerabilities associated with the conventional P2P networks, the protected VPN tunnels, there was felt a need for a system that enables a communication network transmitting sensitive data to retain its anonymity, and protects such a communication network from traffic analysis attacks, without necessitating a compromise on the throughput and performance of the network.

OBJECTS

An object of the present disclosure is to envisage a computer-implemented system and a method that pre-empts traffic analysis attacks on anonymous communication networks.

Another object of the present disclosure is to envisage a computer-implemented system and a method that helps sustain the anonymity associated with a communication network transmitting sensitive data.

Yet another object of the present disclosure is to envisage a computer-implemented system and a method that facilitates fully-cloaked communication between the constituent nodes of a communication network.

Still, a further object of the present disclosure is to envisage a computer-implemented system and a method that uses different encryption keys to encrypt a header portion and a payload portion of a data packet.

One more object of the present disclosure is to bring about a reduction in the time required for processing an (incoming) data packet at a particular computer node and consequentially improve upon the time required to forward transmit the data packet to a next-hop computer node.

Still, a further object of the present disclosure is to envisage a computer-implemented system and a method that determines an encryption key to be used for encrypting a (particular) data packet, directly depending upon the direction of travel of the said data packet.

Yet another object of the present disclosure is to envisage a computer-implemented system and a method that determines a data path to be used for transmitting a (particular) data packet, directly depending upon the direction of travel of the said data packet.

One more object of the present disclosure is to envisage a computer-implemented system and a method that uses optimal load balancing principles whilst randomizing the data paths traversed by data packets and ensures optimum network security as well as optimum network capacity utilization.

SUMMARY

The present disclosure envisages a computer-implemented system, method and a computer program product for facilitating secured, fully cloaked data communication across a communication network arranged using a hub-spoke connection configuration. The present disclosure also envisages continually maintaining the said communication network as an anonymous network and consequentially rendering the said communication network resistant to traffic analysis based technical attacks.

In accordance with the present disclosure, a point-to-point Virtual Private Network (VPN) tunnel is established for facilitating fully cloaked transmission of (at least one) data packet from a source endpoint device to a destination endpoint device. Preferably, the data packet is either created at a node (source endpoint device) forming a part of the said communication network or is received by an edge node (entrance node) of the said communication network, preferably from a desktop computer situated outside the communication network, but communicably coupled to the edge node. Further, the data packet is intended to be transmitted to a server, for example, a cloud server (destination endpoint device) connected to the said computer network via (preferably) an exit node. And throughout the specification, the term 'destination endpoint device' denotes the 'final destination' for data packets whereas the term 'source endpoint device' denotes the point of origin of the data packets.

In accordance with the present disclosure, prior to facilitating transfer of a data packet from a source endpoint device to a destination endpoint device, the destination of the data packet is predetermined, preferably via implementation of well-known network communication principles, and the data packet is subsequently pre-processed by a computer processor preferably installed within the source endpoint device. Preferably, during the stage of pre-processing the data packet, the computer processor installed within the source endpoint device triggers a remote encryption server to calculate an 'end-to-end key' and a 'next-hop-destination key', based preferably but not essentially on at least the IP address assigned to the destination of the data packet, and using any of the well-known symmetric-key algorithms including but not restricted to AES (Advanced Encryption Standard), DES (Data Encryption Standard), Rivest Cipher (RC), and Blowfish.

In accordance with the present disclosure, the end-to-end key, as well as the next-hop-destination key are cryptographically linked to the destination endpoint device, by the encryption server (that originally calculated the end-to-end key and the next-hop-destination key) such that the end-to-end key and the next-hop-destination key are usable only at the destination endpoint device for the purpose of decryption of encrypted portions of the data packet. In accordance with the present disclosure, the end-to-end key is used at the source endpoint device to encrypt the payload portion of the data packet, and again at the destination endpoint device to decrypt the payload portion of the data packet. The encryption of the payload portion of the data packet is maintained throughout the journey of the data packet from the source endpoint device to the destination endpoint device regardless of the path taken (by the data packet), and the number of intermediary nodes present along the said path. The end-to-end key, as the name suggests, is rendered usable only at the destination endpoint device for decryption of the payload portion of the data packet, in addition to its (end-to-end key) usage at the source computing device for encrypting the payload portion. Similarly, the next-hop-destination key is rendered usable to an exit node directly linked to the predetermined destination endpoint device, and to no other intermediate nodes and the source endpoint node.

In accordance with the present disclosure, a plurality of next-hop keys, each corresponding to an intermediary node, are calculated by the remote encryption server, subsequent to which, each of the next-hop keys are cryptographically linked, by the encryption server, to the corresponding intermediary nodes, regardless of whether each of said intermediary nodes form a part of the data path facilitating the transmission of said data packet from the source endpoint device to the destination endpoint device. In an exemplary sense, a next-hop key cryptographically linked to 'Node B' is usable at a one-hop away preceding node, for example, 'Node A' for encryption of predetermined portions of the data packet, and at 'Node B' for decrypting the portions of the data packets encrypted at the 'Node A', provided the data packet was transmitted directly from 'Node A' to 'Node B' without involving any other intermediary nodes. Preferably, the end-to-end key, next-hop-destination key, and each of the next-hop keys are symmetric keys.

Subsequently, a predetermined load-balancing algorithm, for example, a flow-hash based selection algorithm, is implemented by the said processor (installed within the source endpoint device), in addition to the implementation of well-known IP routing principles. Based on the execution of the load-balancing algorithm and the well-known IP routing principles, a plurality of intermediary nodes located one-hop away from the source endpoint device are identified, such that each of the said intermediary nodes could be theoretically used—based on the load determined to be incumbent thereupon—to establish a first-hop for the said data packet from the source endpoint device, in the direction of the destination endpoint device.

While the load-balancing algorithm is executed at the source endpoint device only to identify—based on an underlying predetermined load (data traffic) distribution scheme—a plurality of intermediary nodes one-hop away from the source endpoint device and therefore eligible for establishing the first-hop for the data packet from the source endpoint device, the intermediary node which actually establishes the first-hop for the data packet thereby constituting an incremental extension of the data path from the source endpoint device, is selected, at random, albeit from the group of intermediary nodes initially identified by the predetermined load-balancing algorithm as being one-hop away from the source endpoint device.

As discussed above, the first-hop constitutes the transmission of the data packet from the source endpoint device to an intermediary node. In almost all the scenarios involving packet transfer, it is highly likely that a data packet transmitted from a specific source (endpoint device) to a specific destination (endpoint device) traverses at least one intermediary node situated therebetween, with the intermediary node either directly forwarding the data packet to the destination endpoint device or at least in the direction of the destination endpoint device via a combination of other intermediary nodes identified as constituting a data path to the destination. Therefore, as described above, a first-hop and consequentially an intermediary node constituting the first-hop is identified, at random, but among the intermediary nodes determined to be one-hop away from the source endpoint device and eligible—based on the load incumbent on each of them—to be establishing the said first-hop. Preferably, the first-hop thus identified constitutes a part of yet to be completed data path purported to be used for connecting the source endpoint device with the destination endpoint device. However, given the requirement that the communication between the source endpoint device and the destination endpoint needs to be fully cloaked, and consequentially secured, the data path connecting the source endpoint device and the destination endpoint device is incrementally constructed, with the intermediary nodes facilitating a connection between the source endpoint device and the destination endpoint device, selected at random.

Preferably, soon after the intermediary node (for example, a first intermediary node) constituting the first-hop for the data packet (from the source endpoint device) is identified, the data packet is pre-processed—preferably by the processor installed within the source endpoint device. During the pre-processing of the data packet, the payload portion of the data packet and the header portion of the data packet are encapsulated, thereby resulting in the creation of an encapsulated portion. Following the encapsulation of the payload portion and the original header portion (and the creation of the encapsulated portion), a new header is added onto the encapsulated portion of the data packet.

In accordance with the present disclosure, the original header portion, which gets attached to the payload portion as a consequence of the encapsulation, is therefore referred to as the 'inner header', while the new header added on top of the encapsulated portion, and in turn, on top of the inner header—is referred to as the 'outer header'. Preferably, the length of the outer header is equivalent to the length of the inner header, and the fields incorporated within the outer header are the namesakes and functional equivalents of fields incorporated within the inner header. Preferably, both the inner header as well as the outer header include at least the following fields: 'TTL (time-to-live)', 'source IP address', 'destination IP address', 'protocol' (used for packet transfer), 'packet length', 'header checksum', 'version', 'identifier', 'flags' and 'fragment offset' (total number of packets a message has been broken into).

In accordance with the present disclosure, the 'source IP address' field of the inner header, i.e., the original header portion of the data packet, stores the IP address of the node (computer-based device) from which the data packet originated. In this case, the IP address assigned to the source endpoint device is stored in the 'source IP address' field of the inner header. Likewise, the 'destination IP address' field of the inner header stores the IP address of the node purported to be the final destination for the data packet. In this case, the IP address assigned to the destination endpoint device is stored in the 'destination IP address' field of the inner header. Preferably, throughout the journey of the data packet along the randomized and incrementally constructed data path, the inner header is subjected to iterative decryption and re-encryption, and the values stored within the respective fields of the inner header remain unaltered, except the values stored in the TTL and header checksum fields, which are preferably decremented and rewritten respectively, in accordance with the predetermined rules prescribed by the Internet Engineering Task Force (IETF) Request For Comments (RFC), for satisfying the pre-conditions associated with data integrity checks and error correction.

In accordance with the present disclosure, subsequent to the identification of the first-hop for the data packet, and the identification of an intermediary node constituting the said first-hop (for example, a first intermediary node), the payload portion (forming a part of the encapsulated portion) of the data packet is encrypted using the end-to-end key cryptographically linked to the destination endpoint device. Subsequently, the inner header (also forming a part of the encapsulated portion) of the data packet is encrypted using a next-hop key cryptographically linked to the first intermediary node.

Additionally, post identification of the first-hop and the intermediary node constituting the first-hop, the 'destination IP address' field of the outer header is manipulated—at the source endpoint device—in order to store the IP address of the first intermediary node therein, and to consequentially designate the first intermediary node as an intermediate destination for the data packet en route to the destination endpoint device. Likewise, the 'source IP address' field of the outer header is also processed, at the source endpoint device, and the IP address assigned to the source endpoint device is stored therein, thereby consequentially designating the source endpoint device as the source of the data packet.

In accordance with the present disclosure, the inner header stores the IP addresses—source IP address and destination IP address—of the original source and the final destination of the data packet, and the said IP addresses are never manipulated throughout the journey of the data packet along the incrementally constructed, randomized data path. On the contrary, the IP addresses—source IP address and destination IP address—stored on the outer header are bound to be modified at every intermediary node traversed by the data packet along the said data path, and the source IP address and destination IP address stored on the outer header respectively describe the last intermediary node that transmitted the data packet, and the intermediate destination for the data packet.

Further, post the encryption of the payload portion (using the end-to-end key), and the encryption of the inner header (using the first-hop key cryptographically linked to the first intermediary node), the data packet is transmitted along the data path, and by (the) first-hop, from the source endpoint device to the first intermediary node, based on the IP address stored within the 'destination IP address' field of the outer header—which, as described above, identifies the first intermediary node as the intermediate destination for the data packet. The first-hop along the said data path is considered to be completed when the data packet reaches the first intermediary node, from the source endpoint device. Subsequently, the first intermediary node processes the data packet, removes the outer header and decrypts the inner header of the data packet—using the next-hop key cryptographically linked to the first intermediary node—while maintaining the encryption of the payload portion.

Based on the decryption of the inner header, and the consequential analysis of the 'destination IP address' field of the inner header, the first intermediary node identifies the destination endpoint device designated as the final destination for the said data packet. Subsequent to the identification of the final destination for the data packet, the first intermediary node uses the IP address of the final destination as a basis to execute the well-known principles of IP routing as well as the predetermined load-balancing algorithm (preferably the same algorithm executed by the source endpoint device), and identifies a plurality of intermediary nodes located one-hop away from the first intermediary node, such that each of the said intermediary nodes could be theoretically used—based on the load determined to be incumbent thereupon—to establish a next-hop for the said data packet from the first intermediary node, towards the destination endpoint device.

As was the case with the source endpoint device, the load-balancing algorithm is executed by the first intermediary node only to identify—based on an underlying predetermined load distribution scheme—a plurality of intermediary nodes one-hop away (from the first intermediary node), and therefore eligible for establishing a next-hop for the data packet from the first intermediary node. However, while the initial selection of the plurality of one-hop away intermediary nodes is based on the execution of the predetermined load-balancing algorithm, the intermediary node which actually establishes the next-hop for the data packet, thereby constituting an incremental extension of the corresponding data path from the first intermediary node, is selected, at random, albeit from the group of intermediary nodes initially identified by the predetermined load-balancing algorithm as being one-hop away from the first intermediary node, and therefore eligible for constituting the next-hop. Typically, the next-hop from the first intermediary node for the data packet is likely to constitute either a hop to the destination endpoint device or a hop to yet another intermediary node, for example, a second intermediary node. It is pertinent to note that the composition of the data path, i.e., the length of the data path and the number of intermediary nodes constituting the data path, is determined in a dynamic manner, i.e., at random, as described above and using no predetermined packet routing scheme.

In the event the next-hop for the data packet from the first intermediary node is determined to constitute a hop to the second intermediary node, the first intermediary node consequentially appends a new outer header—usable for routing the data packet from the first intermediary node to the second intermediary node—onto the data packet, and preferably on top of the inner header. Subsequently, the TTL and header checksum fields of the newly appended outer header are also assigned appropriate values in-line with well-known principles of error correction and data integrity verification. Additionally, the newly appended outer header incorporates a 'destination IP address' field storing the IP address of the second intermediary node, thereby designating the second intermediary node as the intermediate destination for the data packet, and a 'source IP address' field storing the IP address of the first intermediary node, thereby designating the first intermediary node as the source of the data packet.

Subsequent to the addition of the new outer header, the decrypted inner header of the data packet—which, as described above, identifies the destination endpoint device as the final destination for the data packet—is re-encrypted using a next-hop key cryptographically linked to the second intermediary node, while the encryption of the payload portion of the data packet is maintained. It is pertinent to note that the inner header of the data packet is only re-encrypted and none of the values stored in the respective fields of the inner header are modified, except the values stored within the TTL and header checksum field, which are preferably decremented and rewritten respectively, in accordance with the predetermined rules prescribed by the Internet Engineering Task Force (IETF) Request For Comments (RFC), for satisfying the pre-conditions associated with data integrity checks and error correction.

Preferably, during the transmission of the data packet along the said randomized and incrementally extended data path, at every intermediary node, the outer header of the data packet carried over from the previous node is removed, and a new outer header incorporating a reduced/decremented TTL value and a rewritten header checksum is appended onto the data packet. Additionally, at every intermediary node, when a new outer header replaces the older outer header, the 'source IP address' field of the newly appended outer header holds the IP address of a preceding intermediary node that was one-hop away and previously received, processed the data packet, thereby designating the preceding one-hop away intermediary node as the (new) source for the data packet. Likewise, at every intermediary node, the 'destination IP address' field of the newly appended outer header holds the IP address of a succeeding node one-hop away—the succeeding one-hop away node selected at random, as described above—thereby designating the succeeding one-hop away intermediary node as the intermediate destination for the data packet.

Preferably, the steps of removing the outer header carried over from a previous intermediary node, appending a new outer header (the newly appended IP header designating a randomly selected one-hop away intermediary node as an intermediate destination for the data packet, and the one-hop away preceding node that previously received and processed the data packet, as the new source for the data packet), assigning an appropriate TTL value and header checksum to the newly appended outer header, modifying the TTL value and header checksum incorporated within the inner header for satisfying the pre-conditions associated with data integrity checks and error correction, identifying the final destination for the data packet based on the analysis of the 'destination IP address' field of the inner header, and re-encrypting the inner header of the data packet using a next-hop key cryptographically linked to intermediary node regarded as the intermediate destination for the data packet, are iteratively performed until the data packet reaches the destination endpoint device via the randomized, incrementally constructed data path. Additionally, after identification of every hop and the intermediary node constituting the corresponding hop, the inner header of the data packet is iteratively re-encrypted using a next-hop key cryptographically linked to the intermediary node constituting the corresponding hop, while maintaining the encryption of the payload portion of the data packet, until the data packet is determined to have reached the destination endpoint device.

As described hitherto, the data path for connecting the source endpoint device and the destination endpoint device, and facilitating transmission of the data packet from the source endpoint device to the destination endpoint device, is incrementally constructed one-hop at a time, i.e., by incorporating intermediary nodes to the data path one (intermediary node) at a time until the data packet reaches the destination endpoint device. The said data path is constructed in a randomized manner, with no specific details about the direction and the number of nodes incorporated into the data path being made known to neither the destination endpoint device, nor the source endpoint device, nor any of the intermediary nodes receiving and forwarding the data packet. The data path is incrementally constructed with the addition of only one-hop at a time, thereby making it nearly impossible for a hacker to snoop on a particular node constituting the data path, i.e., either the source endpoint device or the destination endpoint device or any of the intermediary nodes, and consequentially undermine the efforts of the hacker towards identifying the likely destination of the data packet, as a precursor to staging a traffic analysis attack on the identified destination.

Preferably, at every intermediary node constituting the randomly constructed and incrementally extended data path, the inner header and especially the 'destination IP address' field of the inner header is processed to identify the final destination (i.e., destination endpoint device) of the data packet. Every intermediary node uses the 'destination IP address' field of the inner header as the basis for executing well-known IP routing principles and determining an intermediary node one-hop away, but usable for directing the data packet toward the destination endpoint device. Preferably, when the data packet, traversing the randomized and incrementally constructed data path, reaches an exit node—i.e., an intermediary node one-hop away from the destination endpoint device—the exit node receives the data packet, decrypts the inner header using a next-hop key cryptographically linked to the exit node, processes the 'destination IP address' field of the inner header and determines that the destination endpoint device is one-hop away. Subsequently, the exit node modifies the 'destination IP address' field of the outer header to incorporate therein the IP address of the destination endpoint device and to designate the destination endpoint device as the destination for the data packet, re-encrypts the inner header of the data packet with the next-hop-destination key cryptographically linked to the destination endpoint device, while maintaining the encryption of the payload portion of the data packet. Subsequently, the exit node incrementally extends the data path by one-hop thereby connecting to the destination endpoint device and transmits the data packet to the destination endpoint device.

Finally, when the data packet originating from the source endpoint device reaches the destination endpoint device traversing a plurality of intermediary nodes constituting the said (randomized and incrementally constructed) data path, the destination endpoint device is triggered, preferably by the processor installed therein, to decrypt the inner header using the next-hop-destination key cryptographically (pre) linked to the destination endpoint device. Likewise, the destination endpoint device is triggered by the processor to decrypt the payload portion using the end-to-end key (pre) linked to the destination endpoint device. In doing so, the present disclosure teaches iteratively decrypting and re-encrypting only the inner header of the data packet and maintaining the encryption of the payload portion of the data packet until the data packet reaches the destination endpoint device. Secondly, the present disclosure also teaches safeguarding, by the way of encryption, not only the payload portion of the data packets—as was the case with the prior-art data security solutions—but also the inner header of the data packets, which incorporate sensitive information—including the 'destination IP address' of the data packet—susceptible to traffic analysis based network attacks.

Preferably, the end-to-end key, the respective next-hop-keys, and the next-hop-destination key are mutually different and are rendered usable—by the encryption server—on only the predesignated nodes of the communication network, for the purposes of encryption and decryption of predetermined portions of the data packet. However, the end-to-end key, the respective next-hop-keys, and the next-hop-destination key are regarded as mutually different, only in an exemplary sense, and therefore should not be construed as a limitation of the computer-implemented system, method and computer program product envisaged by the present disclosure. Those skilled in the art would readily appreciate the fact that a single symmetric key, for example, the end-to-end key could be used for encryption and subsequent decryption of the payload portion as well as the inner header of the data packet. Additionally, those skilled in the art would also be able to appreciate that the symmetric keys, i.e., the end-to-end key, next-hop keys, and next-hop-destination key are used in the manner as described above (use of end-to-end key for encryption and decryption of only the payload portion, use of respective next-hop keys for encryption and decryption of only the inner header, use of the next-hop-destination key only at the exit node and the destination endpoint device) only for facilitating fully cloaked transmission of the data packet, and that it is also possible for fully cloaked transmission to be implemented with the use of mutually similar symmetric keys, instead of mutually different symmetric keys.

DETAILED DESCRIPTION

Figure 1A:
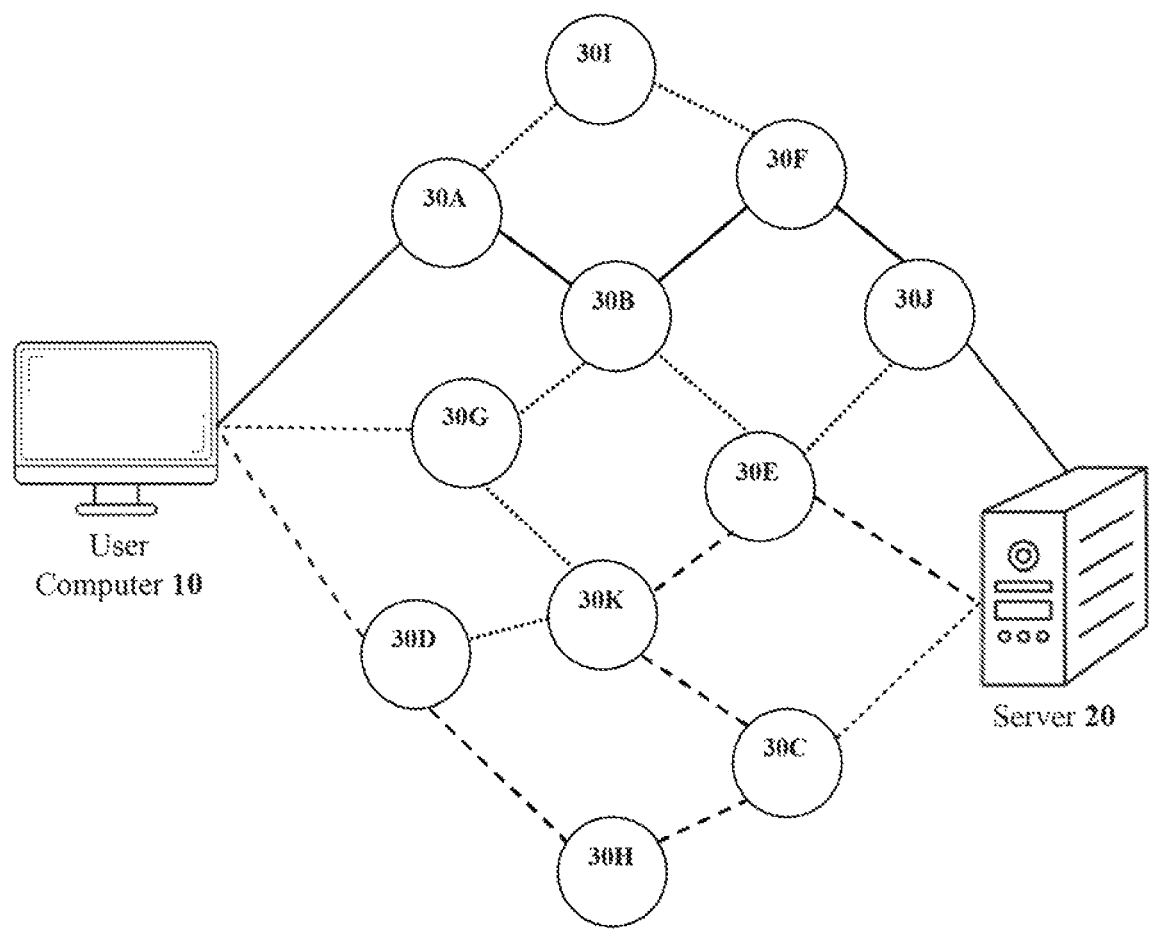
FIG. 1A illustrates an exemplary computer network incorporating a source endpoint device communicably coupled to a destination endpoint device via a plurality of intermediary nodes.

As discussed hitherto, in order to forestall traffic analysis based network attacks and to prevent network attackers from having access to sensitive information stored/exchanged across a computer network by way of compromising the edge nodes of the network, i.e., the nodes serving as the entry point and exit points of a communication network, the present disclosure envisages a computer-implemented system, method and computer program product that assist not only in sustaining the anonymity associated with networks facilitating storage and transmission of sensitive information, but also prevent network attackers having a view and control of only one user computer connected to a communication network-considering the fact that viewing and gaining unauthorised access to only one user computer instead of an entire communication network is comparatively easier—from directing network attacks onto servers and data stores forming a part of the communication network, by determining a pattern of use of routing nodes for communicating with the said servers/data stores, based on the insights gained by subjecting a single user computer (connected to the communication network) to traffic analysis.

Preferably, the computer-implemented system, method and the computer program product envisaged by the present disclosure are designed to be implemented on a communication network having its nodes arranged in accordance with the well-known hub-spoke topology. However, it is pertinent to note that the computer-implemented system, method and computer program product are equally functional and effective on any type of communication network irrespective of the underlying network topology, and the reference to the hub-spoke architecture should be construed only as an exemplary embodiment of the present disclosure and not as a limitation thereof.

The computer-implemented system, method, and the computer program product envisage randomizing a data path connecting a source endpoint device with a destination endpoint device, using randomly selected intermediary link nodes, and attempts, as a consequence of such randomization, to limit the possibility of a network attacker subjecting any given node—either the source endpoint device or the destination endpoint device or any of the intermediary link nodes—to traffic analysis and consequentially determining a pattern of flow of data traffic, and in turn using the pattern of flow of data traffic to identify the location of either the servers/data stores linked to the communication network, or the entry points and the exit points of the communication network, thereby not only compromising the anonymity of the communication network but also gaining insights, for example, the location of network entry points, exit points—the edge nodes—necessary for orchestrating denial of service attacks inter-alia on the communication network.

By randomizing the process of creating a network path/data path for facilitating transmission of a data packet from a source endpoint device to a destination endpoint device, the computer-implemented system, method and the computer program product of the present disclosure ensure that a concrete data path is never formulated for any packet-based communication occurring across the said communication network, thereby preventing network attackers from inferring, based on a traffic analysis performed on at least one user computer (node) connected to the said communication network, the data communication patterns corresponding to the said communication network, as well as (at least) the nodes frequently used for facilitating data transfer across the communication network. Further, by preventing network attackers from inferring the data communication patterns and the nodes frequently involved in data transfer, network attackers are denied an opportunity to conclusively identify the edge nodes, which when identified are known to provide, at least theoretically, a view of and a possible access-albeit unauthorised—to the entire communication network.

Further, the computer-implemented system, method and the computer program product envisage using different headers for facilitating hop-to-hop communication of the data packet (i.e., between various intermediary nodes one-hop away from one another), and for identifying the original source endpoint and the destination endpoint (and accordingly routing the data packet across multiple hops based on the original source endpoint and the destination endpoint) of the data packet. In accordance with the present disclosure, two different headers, i.e., an inner header and an outer header are embedded into the data packet, prior to initiating a transmission of the data packet. Further, while the outer header incorporates information (intermediary source and destination IP addresses) necessary for to facilitating a hop-to-hop communication (for example, from one intermediary node to another), the inner header—encrypted using the end-to-end key cryptographically linked to the destination—incorporates information (original source IP address and final destination IP address) necessary for identifying the original source and the final destination of the data packet.

Additionally, both the inner header (usable for facilitating end-to-end communication of the data packet) and the payload portion of the data packet are encrypted. In a significant deviation from the teachings of the prior art, the encryption of the payload portion (of the data packet) is maintained throughout the hop-to-hop communication of the data packet, and the inner header is iteratively decrypted and subsequently re-encrypted until the data packet reaches the pre-designated final destination, so as to ensure that the integrity of the entire data packet (i.e., the payload portion as well as the inner header identifying the original source and final destination of the data packet) is retained throughout the transmission thereof, and the entire data packet is immunized against traffic analysis based network attacks.

Since traffic analysis based network attacks are largely based on the information snooped from packet headers (also referred to as 'header portion'), the encryption of the payload portion, and the encryption of the inner header (usable for end-to-end communication) of the data packet, in combination with randomized, incremental creation of a corresponding data path across the communication network makes it nearly impossible for network attackers to identify a cluster of inter-communicating nodes frequently participating in data communication and secondly a path likely to be used by said inter-communicating nodes, and consequentially trace back from the cluster of inter-communicating nodes, using the said path as a basis, to one of the edges of the communication network.

Further, incrementally constructing a data path (for facilitating transfer of a data packet from a source endpoint device to a destination endpoint device) by randomly selecting only one intermediary node at a time, to be incorporated as a part of the said data path, as opposed to predetermining the entire data path ensures that the direction of the data path as well as the total length of the data path remains unpredictable and bound to change at random time intervals and in-line with incremental addition of every randomly selected intermediary (link) node, thereby guaranteeing that network attacker having a view and control of an intermediary link node forming (only) a part of the communication network, is unable to accurately and completely infer the purported network path and consequentially launch an attack on (a) destination node which would have otherwise possibly been inferred by the network attackers based on a back-tracing method implemented on the said intermediary link node.

The incremental construction of the data path and the addition of one randomly selected intermediary node to the data path at one point of time ensures that no receiving node (the intermediary node receiving the data packet) is made aware of neither the source of the data packet nor the final destination of the data packet, but only the identity (for instance the IP address) of a preceding intermediary node that transmitted the data packet, and the identity of the intermediary destination to which the data packet is to be subsequently transmitted. Preferably, the identity of the intermediary destination (of the data packet) is also made known to the receiving node just-in-time, and only after the inclusion of a randomly selected intermediary node—as the intermediate destination—onto the data path. Preferably, since the data path is randomly extended one node at a time to facilitate only one hop for the data packet, a network attacker having a view and control of one particular intermediary node would be rendered incapable of inferring the complete network path, and consequentially the designated destination of the data packet as well as the edge nodes facilitating entry and exit of the data packet (into and from the communication network respectively).

Referring to FIG. 1A, there is shown a communication network 100 as envisaged by the present disclosure. The communication network 100 includes a source endpoint device, for example, a user computer (denoted by reference numeral 10) connected to a destination endpoint device, for example, a remote server (denoted by reference numeral 20), via a plurality of intermediary nodes respectively denoted by reference numerals 30A-30J. Preferably, a plurality of encrypted tunnels are created, on top of corresponding physical connections, for selectively interconnecting each of the intermediary nodes 30A-30J with the user computer 10 and the server 20, such that the tunnels created between the intermediary nodes 30A-30J, the user computer 10 and server 20 are in-line with a hub-spoke network connection architecture. However, the tunnels are not pre-constructed but are created just-in-time and in line with the random and incremental selection of at least some of the intermediary nodes 30A-30J, for constituting a dynamic data path connecting the user computer 10 with the server 20. Throughout the remainder of the description, the term 'user computer' (10) is used as an alternative (substitute) to the term 'source endpoint device.' Likewise, the term 'server' (20) is used as an alternative (substitute) to the term 'destination endpoint device'.

In the below-mentioned paragraphs, the various features envisaged by the present disclosure are explained taking into consideration an exemplary scenario involving the transmission of a data packet 12 from the user computer 10 to the server 20 via at least some of the intermediary nodes 30A-30J. Preferably, the data packet 12 includes a payload portion 12A and a header portion 12B (also referred to as a non-payload portion). Typically, the payload portion 12A incorporates the 'data' to be transmitted from the user computer 10 to the server 20, while the header portion/non-payload portion 12B incorporates 'addressing information' corresponding to the transmission of the data packet 12 including at least the source IP address, destination IP address (the original destination address), protocol used for transmitting the data packet, data packet length, total number of packets a particular communication stream has been broken into, and a time-to-live (TTL). Preferably but not essentially, the non-payload portion 12B comprises inter-alia an IP header, an Ethernet header, and any other appropriate application level headers.

In accordance with the present disclosure, the interconnection of at least some of the plurality of intermediary nodes 30A-30J via the corresponding encrypted tunnels renders the communication network 100 anonymous and consequentially induces a sense of anonymity to the data-oriented transactions executed across the communication network 100. In an exemplary scenario preferred for the ease of explanation, the user computer 10 functions as an entry point (endpoint) to the (anonymous) communication network 100, and the intermediary node 30J functions as an exit point (endpoint) to the communication network 100, with the data traffic entering the communication network 100 via the user computer 10, and subsequently leaving the computer network 100 via the exit node 30J to reach the server 20.

The user computer 10 typically includes a first processor (not shown in the figures) installed therein and configured to continuously monitor inter-alia the data packets designated to be transmitted (sent out) to the server (destination endpoint device) 20 via the (anonymous) communication network 100 constituting the intermediary nodes 30A-30J. In a typical implementation, while each of the plurality of intermediary nodes 30A-30J are incorporated in a plurality of data paths (the data paths being formed as a consequence of creation of corresponding encrypted tunnels) deemed theoretically usable for interconnecting the user computer 10 and the server 20, it is also possible that only a certain number of intermediary nodes are utilized instead of all the intermediary nodes 30A-30J for creating the said data paths. FIG. 1A describes all the possible data paths available for interconnecting the user computer 10 with the server 20, with the data path followed by the data packets represented using a solid line and the remaining data paths still theoretically usable for interconnecting the user computer 10 and the server 20 but currently held dormant indicated using dotted lines. As described above, while the solid line is used to indicate a data path from the user computer 10 to the server 20, a dashed line is used to describe a return data path (i.e., from the server 20 to the user computer 10), with the return data being always dissimilar to the data path from the user computer 10 to the server 20, in terms of the intermediary nodes (30A-30J) used for the incremental construction of the respective paths.

In accordance with the present disclosure, each of the intermediary nodes 30A—30J are allocated respective symmetric-keys (Key A-Key J) termed as next-hop keys. Each of the symmetric-keys (Key A-Key J) is cryptographically linked, i.e., cryptographically associated, exclusively with corresponding intermediary nodes 30A-30J. The next-hop keys (Key A-Key J) are rendered usable only for the purpose of encrypting and decrypting, preferably, a subsection of the non-payload portion 12B (the encryption and decryption of the said subsection explained in further detail in the below paragraphs) of the data packet. Preferably, each of the intermediary nodes 30A-30J are communicably coupled to an encryption server 102 through respective wireline channels or wireless communication channels, which in turn enable each of the plurality of intermediary nodes 30A-30J to communicate with the encryption server 102 and trigger the creation and selective sharing—on the basis of exclusivity—of respective next-hop keys (Key A-Key J).

Preferably, the encryption server 102 executes any of the well-known symmetric-key encryption algorithms including but not restricted to AES (Advanced Encryption Standard), DES (Data Encryption Standard), Rivest Cipher (RC), and Blowfish, for generating the next-hop keys (Key A-Key J) cryptographically associated with each of the plurality of intermediary nodes 30A-30J. The encryption server 102, preferably as a response to the requests received from each of the intermediary nodes 30, generates a plurality of different symmetric-keys—by way of executing any of the aforementioned symmetric-key encryption algorithms—and cryptographically associates each of the next-hop keys exclusively with the corresponding individual intermediary nodes (Key A-Key J).

In addition to the next-hop keys (Key A-Key J) cryptographically linked exclusively to the corresponding intermediary nodes (30A-30J), the encryption server 102 also creates, based on any of the aforementioned symmetric-key encryption algorithms, an end-to-end key and a next-hop-destination key, which are cryptographically linked only to the destination endpoint device i.e., the server 20, and an exit node—directly coupled to the server 20—respectively. While in the context of the present disclosure, the end-to-end key, each of the next-hop keys and the next-hop-destination key are explained to be different from one another in terms of the portions of the data packet 12 they encrypt, and also in terms of the nodes at which they are rendered available, it is also possible that a single symmetric key could be used as the end-to-end key at the source endpoint device 10 and the destination endpoint device 20, and as a next-hop key at every intermediary node 30A-30I and as a next-hop-destination key at the exit node 30J.

The end-to-end key, in accordance with the present disclosure is usable only for encryption and decryption of the payload portion 12A, and is rendered accessible only to the user computer 10—for encryption of the payload portion of the data packet—and to the server 20—for decryption of the encrypted payload portion of the data packet. Additionally, the encryption server 102 renders the next-hop-destination key accessible to an exit node directly coupled to (and consequentially one-hop away from) the server 20, such that the inner header of the data packet 12 is encrypted using the next-hop-destination key on its hop to the server 20 from the exit node. The next-hop-destination key enables the said exit node to encrypt—preferably, re-encrypt—the inner header of the data packet bound to reach the destination endpoint device, i.e., server 20 in the next-hop. Likewise, the next-hop-destination is accessed and used by the server 20 to decrypt the inner header 12B of the received data packet 12.

Preferably, but not necessarily, the encryption server 102 creates the said end-to-end key, destination-next-hop key, and the symmetric-keys (Key A-Key J) based at least partially on the data bits incorporated within the payload portion 12A and the non-payload portion 12B, respectively. Further, preferably, the encryption server 102 selects an appropriate symmetric-key encryption algorithm based at least partially on the suitability of the algorithm to the data bits incorporated within the payload portion 12A and the non-payload portion 12B. Further, the encryption server 102 executes a predetermined key distribution management scheme in order to facilitate and control the selective and strictly need-based distribution of the end-to-end key, the destination-next-hop key, and the symmetric-keys (Key A-Key J) to the user computer 10, server 20 and each of the plurality of intermediary nodes 30A-30J. Preferably, each of the symmetric-keys (Key A-Key J) cryptographically linked to the corresponding intermediary nodes 30A-30J, the next-hop-destination key and the end-to-end key cryptographically linked to the server 20 are stored in a memory module (not shown in figures) either forming a part of or communicably coupled to the encryption server 102. Preferably, the creation and the need-based sharing of the end-to-end key, the destination-next-hop key, and the symmetric-keys (Key A-Key J) is governed by the predetermined key distribution management scheme implemented by the encryption server 102.

In accordance with the present disclosure, the first processor (installed within the user computer 10) monitors the various computer-implemented operations performed by the user computer 10 as well as the outbound communication streams—comprising data packets—transmitted from the user computer 10, and directed to the server 20, inter-alia. When the first processor identifies a need to transmit at least one data packet—for instance, the data packet 12—from the user computer 10 to the server 20 via at least some of the intermediary nodes 30A-30J, the first processor subsequently encapsulates the payload portion 12A (of the data packet 12) with the header portion 12B (of the data packet 12), since the data packet 12 is routed through a plurality of private tunnels (interconnecting the intermediary nodes 30A-30J) governed by the execution of any of the well-known encapsulation protocols including Generic Routing Encapsulation (GRE), Point-to-Point Tunnelling Protocol (PPTP), and Layer Two Tunnelling Protocol (L2TP).

In accordance with the present disclosure, the (original) header portion 12B of the data packet 12 incorporates, amongst others, the following major fields: a 'TTL' field indicative of the time-to-live, i.e., lifetime for the data packet 12, a 'source IP address field' indicative of the original source (i.e., the user computer 10) of the data packet 12, a 'destination IP address field' indicative of the final destination (i.e., the server 20) of the data packet 12, and a header checksum. In addition to the aforementioned major fields, the header portion 12B also includes the following fields: 'protocol' (used for packet transfer), 'packet length', 'version', 'identifier', 'flags' and 'fragment offset' (total number of packets a message has been broken into).

In accordance with the present disclosure, subsequent to the encapsulation of the data packet 12, the first processor analyses the header portion 12B and specifically the 'destination IP address' field of the data packet 12, to identify the IP address of the final destination of the data packet 12 (i.e., the server 20). Based on the analysis of the 'destination IP address' field and the consequential identification (network-location) of the server 20 as the final destination for the data packet 12, the first processor executes a predetermined load-balancing scheme to determine a first portion of a data path representing one random hop for the data packet 12 from the user computer 10 to any of the intermediary nodes 30A-30J, and towards the server 20. It is pertinent to note that, while the load-balancing algorithm is executed at the user computer 10 only to identify—based on an underlying predetermined load (data traffic) distribution scheme—a plurality of intermediary nodes (among intermediary nodes 30A-30J) one-hop away from the user computer 10 and therefore eligible for establishing the first-hop for the data packet from the user computer 10, the intermediary node which actually establishes the first-hop for the data packet thereby constituting an incremental extension of the data path from the user computer 10, is selected, at random, albeit from the group of intermediary nodes initially identified by the predetermined load-balancing algorithm as being one-hop away from the user computer 10.

In accordance with the present disclosure, the first processor preferably implements a hash-based load balancing scheme for identifying, at random, one hop for the data packet 12 from the user computer 10 such that the said randomly selected hop directs the data packet 12 to a randomly selected intermediate node (one among intermediary nodes 30A-30J) in turn having more than one (intermediate) node connected thereto, with each such connected intermediary node also usable for directing the data packet 12 to the (same) destination endpoint device, i.e., the server 20. Further, the load-balancing scheme implemented by the first processor preferably emphasizes on enhancing the randomness associated with incremental creation of the data path and the hop-wise transmission of the data path along the said data path, instead of maximizing the throughput associated with transmission of data packets, as was the case with the prior-art solutions.

Preferably, while executing the predetermined load-balancing scheme, the first processor also consults and analyses a Routing Information Base (RIB) or a routing table maintained by the user computer 10—the neighbor table storing information corresponding to all the nodes (in this case, the intermediary nodes) one-hop away from the user computer 10. At least partially based on the analysis of the neighbour table stored on the user computer 10, in-line with well-defined packet routing principles, and subsequent to the execution of the predetermined load-balancing scheme, the user computer 10 randomly selects an intermediary node, for instance, a first intermediary node 30A described as neighboring the user computer 10 and one random hop away from the user computer 10, as an intermediate destination for the data packet 12. The 'one random hop' identified in this manner by the first processor for the data packet from the user computer 10 is termed the 'first-hop' since the data packet is transmitted one (random) hop away from the user computer 10 for the first time.

Figure 1B:
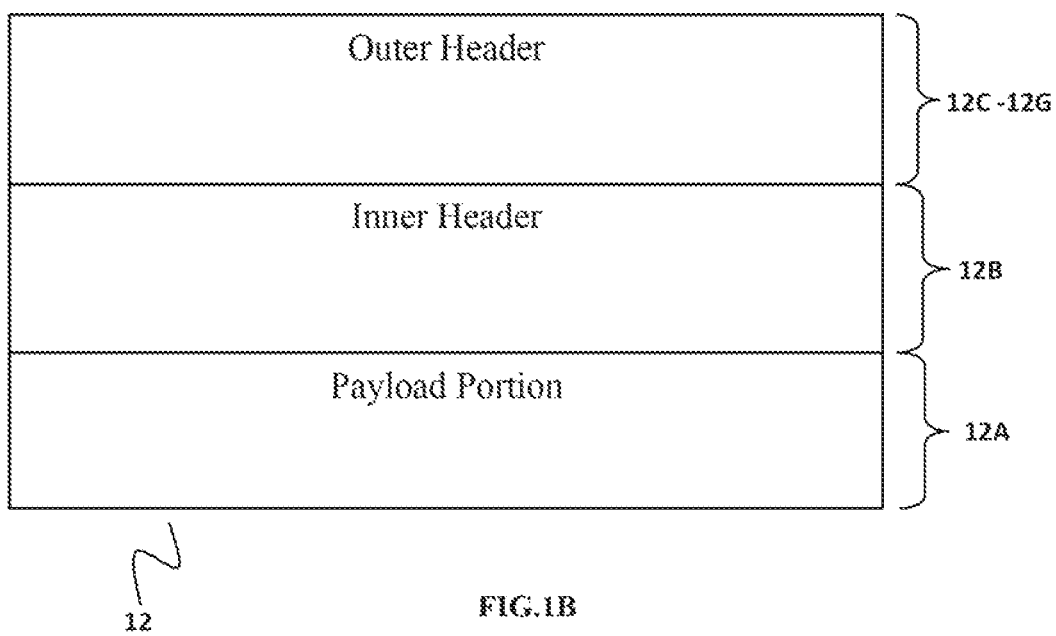
FIG. 1B illustrates the (modified) structure of an exemplary data packet, in accordance with the present disclosure.

Subsequent to identifying the first-hop for the data packet 12 and designating the first intermediary node 30A as the intermediate destination (of the data packet 12) reachable via the first hop, the first processor creates a new outer header 12C (termed 'first outer header' since it describes the first-hop) which in turn designates the first intermediary node 30A as the intermediate destination for the data packet 12 and the user computer 10 as the source of the data packet 12. Preferably, the first processor inserts the first outer header 12C on top of the original header portion 12B thereby re-arranging the original header portion 12B as the inner header (referenced using the reference numeral 12B hereafter). FIG. 1B describes the modified structure of the data packet 12 in view of the insertion of the first outer header 12C on top of the (original) header portion 12B, and the consequential rearrangement of the (original) header portion 12B as the inner header (I 2B).

In accordance with the present disclosure, the length of the first outer header 12C is equivalent to the length of the inner header (i.e., the original header portion 12B), and the fields incorporated within the first outer header 12C are namesakes and functional equivalents of fields incorporated within the inner header 12B. Preferably, both the inner header as well as the outer header include at least the following fields: 'TTL (time-to-live)', 'source IP address', 'destination IP address', 'protocol' (used for packet transfer), 'packet length', 'header checksum', 'version', 'identifier', 'flags' and 'fragment offset' (total number of packets a message has been broken into). As described in one of the earlier paragraphs, the 'source IP address' field of the inner header 12B stores the IP address of the user computer 10 from which the data packet 12 originated, thereby designating the user computer 10 as the source of the data packet 12. Likewise, the 'destination IP address' field of the inner header 12B stores the IP address of the server 20, thereby designating the server 20 as the final destination of the data packet 12.

In accordance with the present disclosure, the first outer header 12C, newly created and inserted on top of the inner header 12B is processed (typically, before the insertion) by the first processor, and the 'source IP address' field of the first outer header 12C is programmed to store the IP address of the user computer 10 from which the data packet 12 originated, thereby designating the user computer 10 as the source of the data packet 12. Further, the 'destination IP address' field of the outer header 12C is programmed to store the IP address of the first intermediary node 30A identified as constituting the said first-hop for the data packet 12 and to consequentially designate the first intermediary node 30A as the intermediate destination for the data packet 12.

Subsequent to the encapsulation of the payload portion 12A with the original header portion 12B of the data packet 12, the creation and insertion of the first outer header 12C on top of the original header portion 12B of the data packet 12, and the consequential rearrangement of the original header portion 12B into the inner header 12B, the first processor initiates encryption of the payload portion 12A using the end-to-end key cryptographically linked to the server 20. In accordance with the present disclosure, the first processor optionally examines the payload portion 12A to determine at least the format of the data embedded therein and encrypts the payload portion 12 using the end-to-end key cryptographically (pre) linked to the server 20. In accordance with one embodiment of the present disclosure, the first processor triggers the encryption server 102 to generate and share the end-to-end key (the end-to-end key being different from each of the next-hop keys cryptographically linked to the respective intermediary nodes 30A to 30J) necessary for the encryption of the payload portion 12A. Alternatively, the first processor generates the end-to-end key independent of the encryption server 102 using any of the aforementioned well-known symmetric-key encryption algorithms encrypts the payload portion 12A using the end-to-end key and executes the predetermined key distribution management scheme to share the end-to-end key with the server 20 so that the end-to-end key could be used by the server 20 to decrypt the payload portion 12A of the data packet 12 received via the random and incrementally constructed data path.

Subsequent to the encryption of the payload portion 12A of the data packet, the first processor encrypts the inner header 12B—storing the IP address of the user computer 10 in the corresponding 'source IP address field' and designating the user computer 10 as the original source of the data packet 12, and storing the IP address of the server 20 in the corresponding 'destination IP address' field and designating the server 20 as the final destination for the data packet 12—using a next-hop key (for example, Key A) cryptographically liked to the first intermediary node 30A, since the first intermediary node 30A has been identified by the user computer 10, as described above, as accommodating the first-hop for the data packet from the user computer 10. In accordance with one embodiment of the present disclosure, the first processor triggers the encryption server 102 to generate and share the next-hop key cryptographically linked to the first intermediary node 30A, for the purpose of encrypting the inner header 12B of the data packet 12. Alternatively, the first processor (installed within the source endpoint device 10) receives a next-hop key (in this case, the Key A) cryptographically linked to the first intermediary node 30A via the predetermined key distribution management scheme, which in turn would have been executed by the first intermediary node 30A (and a second processor installed therein) to create and subsequently share, independent of the encryption server 102, a corresponding next-hop key which is cryptographically linked to the first intermediary node 30A. Preferably, the first intermediary node 30A (and the second processor installed therein) utilizes the key distribution management scheme to share the corresponding next-hop key (the next-hop key cryptographically linked to the first intermediary node 30A) with every node located one-hop away from the first intermediary node 30A—identified as such on the basis of analysis of a neighbour table stored within the first intermediary node 30A—such that any of the one-hop away neighboring intermediary nodes (the source endpoint device 10 in this case) could use the next-hop key cryptographically linked to the first intermediary node 30A, to encrypt the inner header 12B of the data packet 12 when the data packet 12 is directed to the first intermediary node 30A.

In accordance with the present disclosure, subsequent to the encryption of the payload portion 12A using the end-to-end key and the encryption of the inner header 12B using the next-hop key cryptographically linked to the first intermediary node 30A constituting the first-hop for the data packet 12, the first processor incrementally extends the data path by the said first-hop, thereby consequentially incorporating the first intermediary node 30A into the data path, and provides for the data packet 12 to be transmitted along the said data path, from the user computer 10 to the first intermediary node 30A. Subsequent to the identification of the first-hop—constituting the first portion of the data path—from the user computer 10 to the first intermediary node 30A, the first processor creates an encrypted tunnel between the user computer 10 and the first intermediary node 30A, and triggers the transmission of the encrypted data packet 12—incorporating the encrypted payload portion 12A and inner header 12B; the outer header 12C of the data header preferably kept clear/unencrypted, since it incorporates information descriptive of only the first-hop of the data packet 12—along the said data path, and by one-hop (i.e., the first-hop, in this case), to the first intermediary node 30A. The first processor facilitates incremental extension of the data path by (only) one hop at a time to incorporate a randomly selected intermediary node (in this case the first intermediary node 30A) thereto so that the user computer 10 is aware only of the one-hop away succeeding node, i.e., the first intermediary node 30A, to which the data packet is transmitted, and to also ensure that the first intermediary node 30A is made aware only of the one backward hop away preceding node i.e., the user computer 10 from which the data packet was received—with the next immediate destination (node) one further hop (referred to as next-hop) away from the first intermediary node 30A to be decided and selected on a random basis, as described in the below paragraphs.

In this manner, the first processor (installed within the user computer 10) guarantees that a network attacker is unable to identify a pattern of repetitive communication between the user computer 10 and the first intermediary node 30A, since there is no guarantee, given the randomness associated with the selection of an intermediary node (30A-30J), that any other data packet emanating from the user computer 10 is also directed via the first intermediary node 30A. In this manner, the user computer 10, the first intermediary node 30A (as well as the remaining intermediary nodes 30B-30J and the server 20) are rendered immune to traffic analysis based network attacks, which otherwise in a conventional network configuration, would have possibly enabled the network attacker to firstly identify a packet transfer pattern associated with the user computer 10 and the first intermediary node 30A, and secondly infer the user computer 10 as the entry node for the communication network 100, based on the traffic analysis performed on either the user computer 10 or the first intermediary node 30A, which in turn describes a pattern of repetitive transactions emanating always from the user computer 10 and directed to the first intermediary node 30A.

In accordance with the present disclosure, the first intermediary node 30A receives the encrypted data packet 12 that travels one-hop (first-hop, in this case) along the incrementally and randomly extended data path and across the encrypted tunnel from the user computer 10, and firstly discards the first outer header attached to the payload portion 12A and inner header 12B of the data packet 12. Subsequently, a second processor (not shown in figures) installed within the first intermediary node 30A decrypts the inner header 12B of the data packet 12 while maintaining the encryption of the payload portion 12A. Preferably, the first intermediary node 30A decrypts the inner header 12B of the data packet 12 using the symmetric-key cryptographically linked thereto, i.e., the Key A, retrieved from the encryption server 102 via the predetermined key distribution management scheme. Post decrypting the inner header 12B of the data packet 12, the first intermediary node 30A processes the 'destination IP address' field of the decrypted inner header 12B and identifies the server 20 as the final destination for the data packet 12. Accordingly, the second processor consults a Routing Information Base (RIB) or a routing table preferably stored within the first intermediary node 30A and firstly determines if the IP address stored within the 'destination IP address' field of the decrypted inner header 12B, i.e., the IP address corresponding to the server 20, is listed within the routing table of first intermediary node 30A, indicating that the server 20 is one-hop away from the first intermediary node 30A. Since a routing table lists all the nodes/devices reachable from a given node (in this case, the first intermediary node 30A) by one-hop, and the respective IP address of each such one-hop away nodes/devices, if the IP address of the server 20 is listed in the routing table stored within the first intermediary node 30A, it is implied that the server 20 is reachable from the first intermediary node 30A by one-hop.

Accordingly, if the routing table of the first intermediary node 30A lists the server 20 as being one-hop away from the first intermediary node 30A, the first intermediary node 30A determines that the server 20 is reachable by one-hop, i.e., a next-hop, which is an addendum to the first-hop for the data packet 12 from the user computer 10 to the first intermediary node 30A. Subsequent to the identification of the next-hop from the first intermediary node 30A to the server 20, the first intermediary node 30A designates the said next-hop as a hop to the destination, i.e., the server 20. While not modifying the values stored in the 'source IP address' and 'destination IP address' fields of the inner header 12B, the second processor (installed within the first intermediary node 30A) re-encrypts the inner header 12B using the next-hop-destination key cryptographically liked to the server 20. The second processor also maintains the encryption of the payload portion 12A, while creating a 'second outer header' 12D as a replacement for the discarded first outer header 12C. The 'source IP address' field of the second outer header 12D is programmed to designate the first intermediary node 30A as the 'source' node from where the data packet 12 originated. Likewise, the 'destination IP address' field of the second outer header 12D is programmed to designate the server 20 as the 'destination' for the data packet 12. Subsequently, the second processor installed within the first intermediary node 30A creates another encrypted tunnel between the first intermediary node 30A and the server 20, thereby incrementally extending the data path to incorporate therein the next-hop, to the server 20, for the data packet 12. Subsequent to the incremental extension of the data path, for incorporating the next-hop to the server 20, the second processor triggers the transmission of the encrypted data packet 12—incorporating the encrypted payload portion 12A, re-encrypted (using the next-hop-destination key cryptographically linked to the server 20) inner header 12B, and an unencrypted second outer header 12D—along the said encrypted tunnel, and along the said incrementally extended data path, from the first intermediary node 30A to the server 20.

Otherwise, if the analysis of the routing table stored within the first intermediary node 30A reveals that the server 20, the final destination of the data packet 12, is not one-hop away from the first intermediary node 30A, then the first intermediary node 30A executes the predetermined load-balancing scheme, and randomly selects, albeit at least partially based on a combination of analysis of the routing table (of the first intermediary node 30A), a second intermediary node 30B neighboring the first intermediary node 30A and one (random) hop away from the first intermediary node 30A, as the next-hop for the data packet 12. Theoretically, while it is possible that the routing table of the first intermediary node 30A lists (intermediary) nodes 30E, 30C, 30D, 30H, 30I and 30K in addition to the intermediary node 30B as neighbours and as being one-hop away from the first intermediary node 30A, the first intermediary node 30A selects the second intermediary node 30B on a random basis, in order to eliminate any probabilities of creating an obvious traffic pattern.

Subsequently, the second processor installed within the first intermediary 30A incrementally extends the data path—previously connecting the user computer 10 and the first intermediary node 30A—by one-hop and by one node, by way of incorporating the second intermediary node 30B into the data path. Consequentially, the second intermediary node 30B is designated as the next intermediate destination for the data packet 12. As soon as the data path is incrementally extended by one-hop from the first intermediary node 30A to the second intermediary node 30B, thereby constituting the next-hop for the data packet 12, the second processor installed within the first intermediary node 30A, while not modifying the values stored in the 'source IP address' and 'destination IP address' fields of the inner header 12B, re-encrypts the inner header 12B using the next-hop key (for example, KeyB) cryptographically liked to the second intermediary node 30B. The second processor also maintains the encryption of the payload portion 12A but creates a 'third outer header' 12E as a replacement for the discarded first outer header 12C. The 'source IP address' field of the third outer header 12E is programmed to designate the first intermediary node 30A as the source node from where the data packet 12 originated, and the 'destination IP address' field of the third outer header 12E is programmed to designate the second intermediary node 30B as the intermediate destination for the data packet 12.

Subsequently, the second processor creates an encrypted tunnel between the first intermediary node 30A and the second intermediary node 30B, and triggers the transmission of the encrypted data packet 12—incorporating the encrypted payload portion 12A, re-encrypted (using the next-hop key cryptographically linked to the second intermediary node 30B) inner header 12B, and the unencrypted third outer header 12D—along the said encrypted tunnel, and along the said incrementally extended data path, from the first intermediary node 30A to the second intermediary node 30B. The second processor facilitates incremental extension of the data path by (only) one hop, i.e., from first intermediary node 30A to second intermediary node 30B thereby ensuring that the first intermediary node 30A is aware only of one-hop away succeeding node, i.e., the second intermediary node 30B to which the data packet is transmitted, and to also ensure that the second intermediary node 30B is made aware only of the one hop away preceding node i.e., the first intermediary node 30A from which the data packet was received—with the next immediate destination (node) one further hop (also referred to as a next-hop) away from the second intermediary node 308 to be decided and selected on a random basis.

In this manner, the second processor guarantees that a network attacker is unable to identify a pattern of repetitive communication between the first intermediary node 30A and the second intermediary node 30B, since there is no guarantee, given the randomness associated with the selection of an intermediary node (30C-30J), that any other data packet emanating from the first intermediary node 30A is also directed via the second intermediary node 30B. In this manner, the first intermediary node 30A, the second intermediary node 30B, the user computer 10 (as well as the remaining intermediary nodes 30B-30J and the server 20) are rendered immune to traffic analysis based network attacks, which otherwise in a conventional network configuration, would have possibly enabled the network attacker to firstly identify a packet transfer pattern associated with the first intermediary node 30A and the second intermediary node 30B, and secondly infer the user computer 10 as the entry node for the communication network 100 by tracing backwards from the second intermediary node 30B based on the packet transfer pattern hypothetically established based on the repetitive communication observed, via traffic analysis, between the second intermediary node 30B, first intermediary node 30A and the user computer 10.

In accordance with the present disclosure, the second intermediary node 30B receives the encrypted data packet that travelled an additional hop subsequent to the first-hop (between the user computer 10 and the first intermediary node 30A) and a next-hop (from the first intermediary node 30A to the second intermediary node 30B) along the data path and consequentially along the encrypted tunnel incrementally and randomly extended firstly from the user computer 10 to the first intermediary node 30A, and secondly from the first intermediary node 30A to the second intermediary node 30B. At the second intermediary node 30B, a third processor (not shown in figures) installed within the second intermediary node discards the third outer header 12E attached to the payload portion 12A and inner header 12B of the data packet 12. Subsequently, the third processor installed within the second intermediary node 30B decrypts the inner header 12B of the data packet 12 while maintaining the encryption of the payload portion 12A. Preferably, the second intermediary node 30B decrypts the inner header 12B of the data packet 12 using the symmetric-key cryptographically (i.e., Key B) linked thereto (i.e., the second intermediary node 30B), and retrieved from the encryption server 102 via the predetermined key distribution management scheme. Post decrypting the inner header 12B of the data packet 12, the second intermediary node 30B processes the 'destination IP address' field of the decrypted inner header 12B and identifies the server 20 as the final destination for the data packet 12. Accordingly, the third processor consults a Routing Information Base (RIB) or a routing table preferably stored within the second intermediary node 30B and firstly determines if the IP address stored within the 'destination IP address' field of the decrypted inner header 12B, i.e., the IP address corresponding to the server 20, is listed within the routing table of the second intermediary node 30B, indicating that the server 20 is one-hop away from the second intermediary node 30B. Since a routing table lists all the nodes/devices reachable from a given node (in this case, the second intermediary node 30B) by one-hop, and the respective IP address of each such one-hop away nodes/devices, if the IP address of the server 20 is listed in the routing table stored within the second intermediary node 30B, it is implied that the server 20 is reachable from the second intermediary node 30B by one-hop.

Accordingly, if the routing table of the second intermediary node 30B lists the server 20 as being one-hop away from the second intermediary node 30B, the second intermediary node 30B determines that the server 20 is reachable by one-hop, i.e., yet another next-hop, which is an addendum to the first-hop for the data packet 12 from the user computer 10 to the first intermediary node 30A, and the next-hop from the first intermediary node 30A to the second intermediary node 30B. Subsequent to the identification of the next-hop from the second intermediary node 30B to the server 20, the third processor designates the second intermediary node 30B as the exit node, and the next-hop for the data packet 12 as a hop to the destination, i.e., the server 20. While not modifying the values stored in the 'source IP address' and 'destination IP address' fields of the inner header 12B, the third processor re-encrypts the inner header 12B using the next-hop-destination key cryptographically liked to the server 20. The third processor also maintains the encryption of the payload portion 12A, while creating a 'forth outer header' 12F as a replacement for the discarded third outer header 12F. The 'source IP address' field of the fourth outer header 12F is programmed to designate the second intermediary node 30B as the source node from where the data packet 12 originated. Likewise, the 'destination IP address' field of the fourth outer header 12F is programmed to designate the server 20 as the destination for the data packet 12. Subsequently, the third processor creates another encrypted tunnel between the second intermediary node 30A and the server 20, thereby incrementally extending the data path to incorporate therein yet another next-hop, to the server 20, for the data packet 12. Subsequent to the incremental extension of the data path for incorporating the next-hop to the server 20, the third processor triggers the transmission of the encrypted data packet 12—incorporating the encrypted payload portion 12A, re-encrypted (using the next-hop-destination key cryptographically linked to the server 20) inner header 12B, and an unencrypted forth outer header 12F—along the said encrypted tunnel, and the said incrementally extended data path, from the second intermediary node 30B to the server 20.

Otherwise, if the analysis of the routing table stored within the second intermediary node 30B reveals that the server 20, the final destination of the data packet 12, is not one-hop away from the second intermediary node 30B, then the second intermediary node 308 executes the predetermined load-balancing scheme, and randomly selects, albeit at least partially based on a combination of analysis of the routing table (of the second intermediary node 30B), a third intermediary node 30F neighbouring the second intermediary node 30B and one (random) hop away from the second intermediary node 30B, as the next-hop for the data packet 12. Theoretically, while it is possible that the routing table of the second intermediary node 30B lists (intermediary) nodes 30E, 30H, 30I and 30K in addition to the third intermediary node 30F as neighbours and as being one-hop away from the second intermediary node 30B, the second intermediary node 30B selects the third intermediary node 30F on a random basis, in order to eliminate any probabilities of creating an obvious traffic pattern.

Subsequently, the third processor incrementally extends the data path—the data path previously connecting the user computer 10, the first intermediary node 30A and the second intermediary node 30B—by one-hop and by one node, by way of incorporating the third intermediary node 30F thereto. Consequentially, the third intermediary node 30F is designated as the next intermediate destination for the data packet 12. As soon as the data path is incrementally extended by one-hop from the second intermediary node 30B to the third intermediary node 30F thereby constituting the next-hop for the data packet 12, the third processor, while not modifying the values stored in the 'source IP address' and 'destination IP address' fields of the inner header 12B, re-encrypts the inner header 12B using the next-hop key cryptographically liked to the third intermediary node 30F (i.e., Key F). The third processor also maintains the encryption of the payload portion 12A but creates a 'fifth outer header' 12G as a replacement for the discarded third outer header 12E. The 'source IP address' field of the fifth outer header 12G is programmed to designate the second intermediary node 30B as the source node from where the data packet 12 originated, and likewise the 'destination IP address' field of the fifth outer header 12G is programmed to designate the third intermediary node 30F as the intermediate destination for the data packet 12. Subsequently, the third processor creates an encrypted tunnel between the second intermediary node 30B and the third intermediary node 30F, and triggers the transmission of the encrypted data packet 12—incorporating the encrypted payload portion 12A, re-encrypted (using the next-hop key cryptographically linked to the third intermediary node 30F) inner header 12B, and the unencrypted fifth outer header 12G—along the said encrypted tunnel, and the said incrementally extended data path, from the second intermediary node 30B to the third intermediary node 30F.

In accordance with the present disclosure, the process of incrementally extending the data path by incorporating randomly selected intermediary nodes (30C-30E, 30G-30J) thereto, one at a time, and incrementally creating encrypted tunnels for connecting the randomly selected intermediary nodes, is repeated until the data packet reaches the exit node 30 one hop away from the server 20 (as shown FIG. 1A). Preferably, until the data packet is transmitted to the exit node 303 from the third intermediary node 30F via the one or more remaining intermediary nodes 30C, 30D, 30E, 30G, 30H and 30I, the data path continues to get extended by one random node at a time, and consequentially encrypted tunnels are created to connected iteratively to connect to such randomly selected (intermediary) nodes.

Further, as a consequence of inclusion of new, randomly selected intermediary nodes to the data path, at every such randomly selected intermediary node, the outer header is discarded, and a new outer header (designating a randomly selected one-hop away intermediary node as an intermediate destination for the data packet, and the one-hop away preceding node that previously received and processed the data packet, as the new source for the data packet) is appended onto the data packet 12, until the data packet 12 reaches the final destination, i.e., the server 20. Further, at every such randomly selected intermediary node, the inner header 12B of the data packet is re-encrypted using the next-hop keys cryptographically linked with the respective intermediary nodes 30C, 30D, 30E, 30G and 30I—depending upon how many of the remaining intermediary nodes 30C, 30D, 30E, 30G and 30I are randomly and incrementally incorporated into the data path—while the original encryption of the payload portion 12A of the data packet 12 (performed using the end-to-end key) is maintained until the data packet 12 reaches the final destination, i.e., the server 20.

In accordance with the present disclosure, when the data packet 12 reaches the exit node 30J via one or more intermediary nodes 30C, 30D, 30E, 30G and 30I, a processor installed within exit node 303 discards the outer header carried over from the intermediary node which transmitted the data packet 12 to the exit node 30J, and decrypts the inner header 12A of the (received) data packet 12 using a next-hop key cryptographically linked to the intermediary node which transmitted the data packet 12 to the exit node 30J. Subsequent to decrypting the inner header 12B, the processor consults the routing table stored within the exit node 30J, and identifies, based on the IP address of the server 20 stored therein, that the server 20 is one-hop away (from the exit node 30J). Accordingly the processor creates a new outer header which in turn describes the exit node 30J as the source of the data packet 12—by storing the IP address of the exit node 30J in the 'source IP address' field of the new outer header—and the server 20 as the final destination of the data packet—by storing the IP address of the server 20 in the 'destination IP address' field of the new outer header. Subsequently, the exit node 303 appends the new outer header on top of the encrypted payload portion 12A and the inner header 12B of the data packet 12, and while not modifying the values stored in the 'source IP address' and 'destination IP address' fields of the inner header 12B, re-encrypts the inner header 12B using the next-hop-destination key retrieved from the encryption server 102 as a consequence of the execution of the predetermined key distribution management scheme. All the while, the exit node 30J maintains the encryption of the payload portion 12A of the data packet.

Subsequently, the processor installed within the exit node 30J creates another encrypted tunnel between the exit node 30J and the server 20, thereby incrementally extending the data path to incorporate therein the next-hop, to the server 20, for the data packet 12. Subsequent to the incremental extension of the data path, for incorporating the next-hop to the server 20, the processor triggers the transmission of the encrypted data packet 12—incorporating the encrypted payload portion 12A, re-encrypted (using the next-hop-destination key cryptographically linked to the server 20) inner header 12B, and an unencrypted newly created outer header—along the said encrypted tunnel, and along the said incrementally extended data path, from the exit node 30J to the server 20.

Finally, when the data packet originating from the user computer 10 (source endpoint device) reaches the server 20 (destination endpoint device) traversing a plurality of intermediary nodes (i.e., intermediary nodes 30A, 30B, 30F, 303 and one or more of the remaining intermediary nodes 30C, 30D, 30E, 30G, 30H, 30I) constituting the said (randomized and incrementally constructed) data path. Subsequently, the server 20 decrypts the inner header 12B using the next-hop-destination key cryptographically (pre) linked thereto. Likewise, server 20 decrypts the payload portion 12 using the end-to-end key (pre) linked thereto. In doing so, the server 20 illustrates the manner in which the payload portion 12A is persistently secured and therefore rendered immune to traffic analysis based network attacks throughout the transmission of the data packet 12, from the user computer 10 through a plurality on intermediary nodes 30A-30J to the server 20.

Further, it is pertinent to note that while the first intermediary node 30A, as well as the second intermediary node 30B, and the third intermediary node 30F execute the predetermined load-balancing algorithm only to identify—based on an underlying predetermined load (data traffic) distribution scheme—a plurality of intermediary nodes one-hop away therefrom and therefore eligible for establishing the respective hops for the data packet 12, the intermediary nodes which actually establish the respective hops for the data packet 12 thereby constituting an incremental extension of the data path, are selected, at random, albeit from the group of intermediary nodes initially identified by the predetermined load-balancing algorithm as being one-hop away from the first intermediary node 30A, second intermediary node 30B and third intermediary node 30F respectively.

Figure 2A:
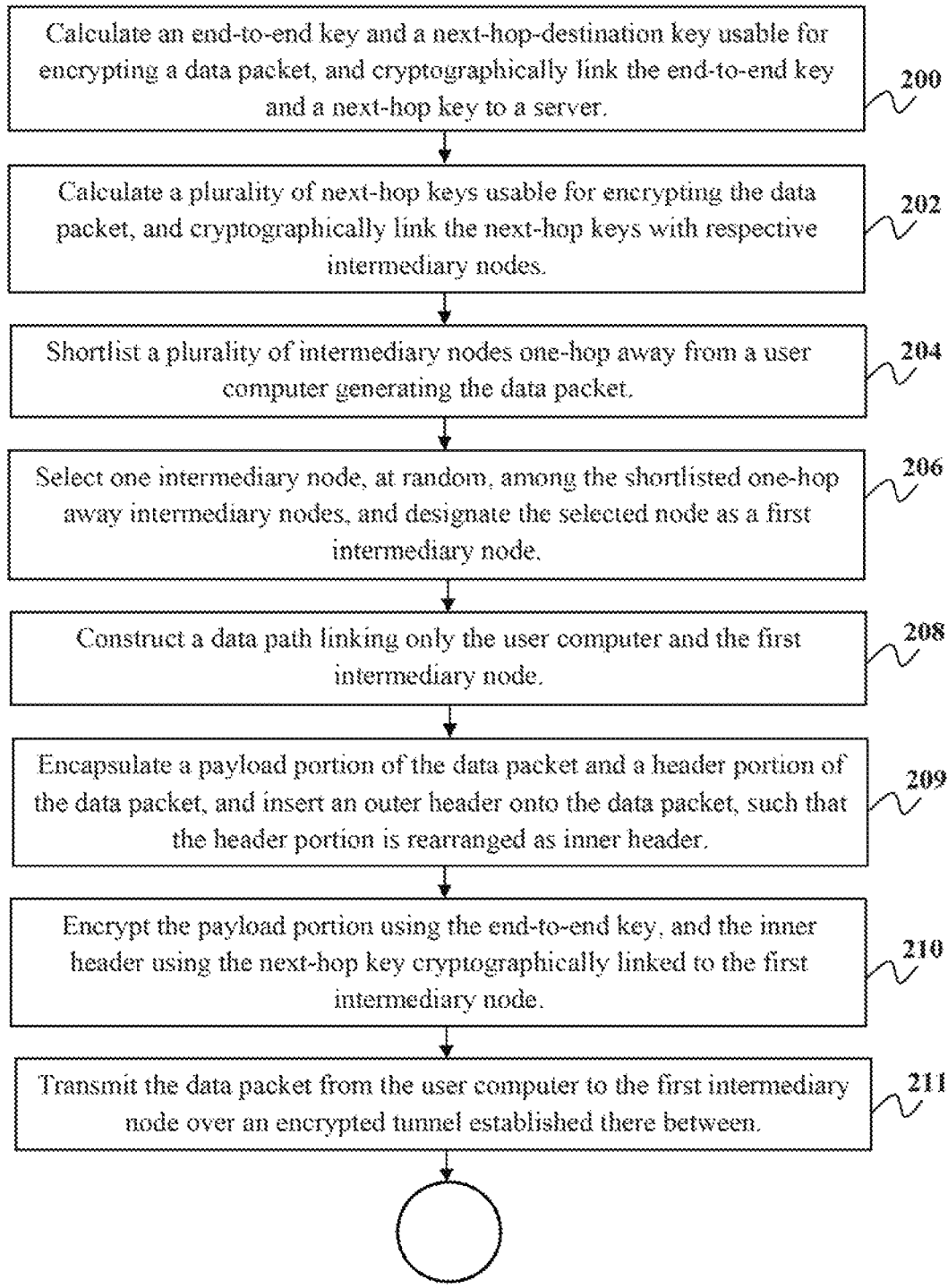
FIG. 2A and FIG. 2B in combination illustrate a flowchart describing the steps involved in the computer-implemented method for facilitating secured data communication between a source endpoint device and a destination endpoint device connectable via a plurality of intermediary nodes.
Figure 2B:
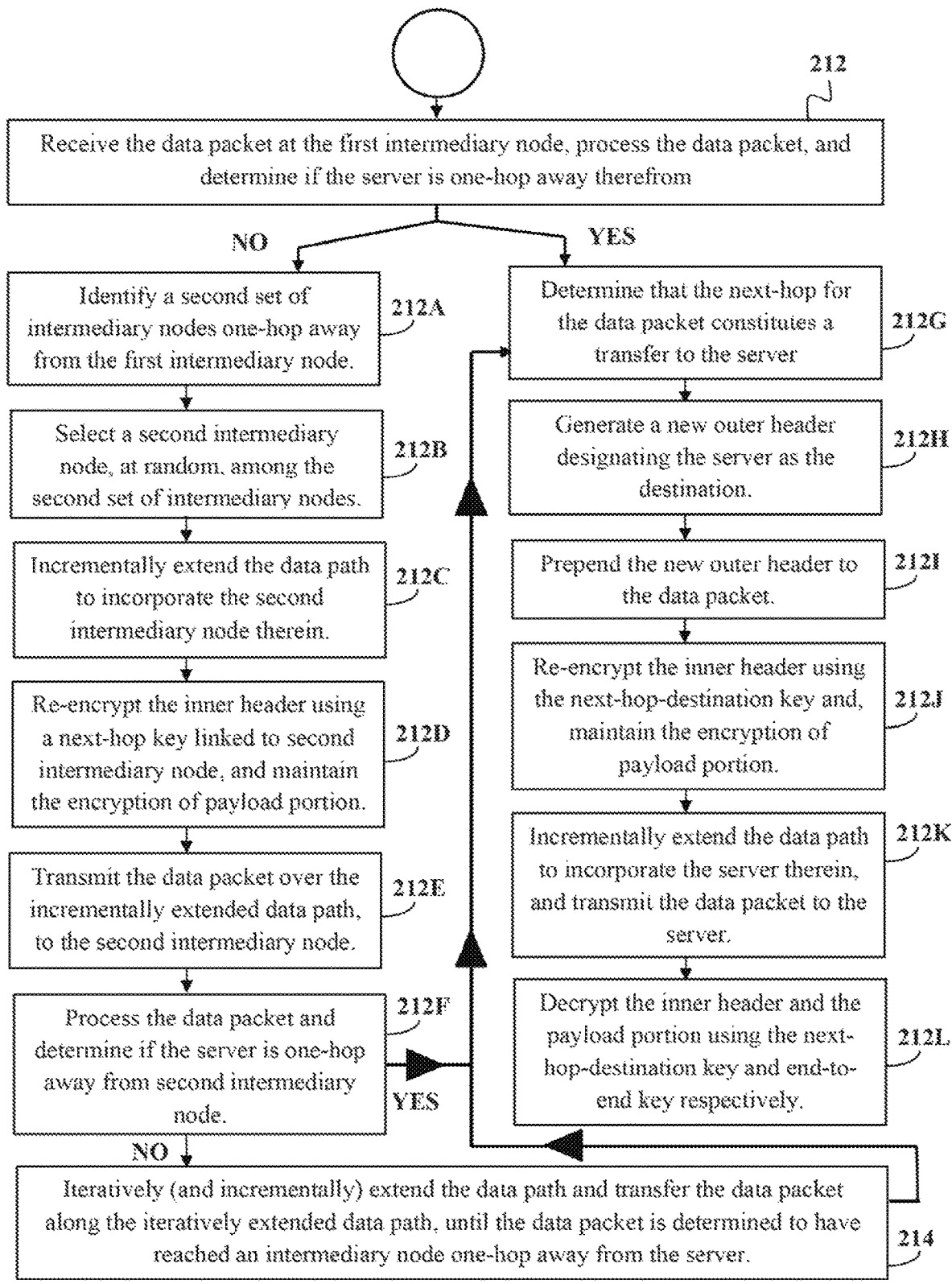

Referring to FIG. 2A and FIG. 2B in combination, there is shown a flowchart illustrating the steps involved in the method for facilitating secured data communication between a source endpoint device (user computer 10) and a destination endpoint device (server 20) connected via a plurality of intermediary nodes (30A-30J). The execution of the method begins at step 200 wherein for a data packet 12 to be transmitted from the user computer 10 to the server 20, an end-to-end key and a next-hop-destination key are calculated, preferably by a remote encryption server cooperating with the user computer 10. The end-to-end key and the next-hop-destination key are calculated preferably but not essentially based on at least the IP address assigned to the destination of the data packet, and using any of the well-known symmetric-key algorithms including but not restricted to AES (Advanced Encryption Standard), DES (Data Encryption Standard), Rivest Cipher (RC), and Blowfish. Subsequently, the end-to-end key and the next-hop-destination key are cryptographically linked, preferably by the encryption server, to the server 20 in a sense that they (the end-to-end key and the next-hop-destination key) are usable only at the server 20 for decryption of the payload portion 12A and inner header 12B of the data packet 12—notwithstanding the use of the end-to-end key and next-hop-destination key, given their symmetric functionality, at the user computer 10 and the exit node 30J respectively for encrypting the payload portion 12A and inner header 12B of the data packet 12.

At step 202, a plurality of next-hop keys (Key A-Key J) each corresponding to the respective intermediary nodes (30A-30J) are created using any of the aforementioned symmetric-key encryption algorithms. Each of the next-hop keys (Key A-Key J) are cryptographically linked to the respective intermediary nodes (30A-30J). For example, a next-hop key, Key A, cryptographically linked to the first intermediary node 30A is usable at the first intermediary node 30A to decrypt the inner header 12B of the data packet 12 received from any one-hop away node (in this case, the user computer 10 is regarded as being one-hop away from the first intermediary node 30A), and also at such a one-hop away node (i.e., at least at the user computer 10 which is one-hop away from the first intermediary node 30A) for encryption of the inner header 12B of the data packet 12, prior to the transmission of the data packet 12 (to the first intermediary node 30A). Every intermediary node among the (intermediary) nodes 30A-30J is cryptographically linked to a corresponding next-hop key regardless of whether each of said intermediary nodes form a part of a data path facilitating the transmission of the data packet 12. However, only in the case of the exit node 30J and the server 20, the next-hop-destination key is used, instead of the next-hop key, for encryption and subsequent decryption of the inner header 12B respectively, since the exit node 30J is located one-hop away from the server 20.

At step 204, since the data packet is to be transmitted from the user computer 10, a plurality of intermediary nodes among the intermediary nodes 30A-30J one-hop away from the user computer 10 are shortlisted (identified). Preferably, the first processor (installed within the user computer 10) consults a routing table (corresponding to the user computer 10) storing the IP addresses of all the nodes located one-hop away from the user computer 10, and based on the execution of well-known packet routing principles identifies, from the routing table, the intermediary nodes one-hop away from the user computer 10. The intermediary nodes (among intermediary nodes 30A-30J) thus identified based on a consultation with the routing table (of user computer 10) are considered to constitute a first-hop for the data packet 12 from the user computer 10 to the server 20. Further, the first processor executes a load-balancing scheme with reference to each the intermediary nodes determined to be one-hop away from the user computer 10 and determines if each of those one-hop away intermediary nodes satisfy the load balancing criteria predefined by the load-balancing scheme. Optionally, any of the one-hop away intermediary nodes not satisfying the load-balancing criteria are dropped off the list, and the one-hop away intermediary nodes satisfying the load-balancing criteria are retained and considered at the next step 206.

At step 206, the first processor selects, at random, one intermediary node, from the shortlisted intermediary nodes, as the node constituting the first-hop for the data packet from the user computer 10. Subsequently, the intermediary node constituting the first-hop for the data packet 12 is termed as the first intermediary node 30A. And at step 208, subsequent to the identification of the first intermediary node 30A as constituting the first-hop for the data packet 12, a data path is constructed between the user computer 10 and the randomly selected first intermediary node 30A. In accordance with the present disclosure, the creation of a data path between the user computer 10 and the first intermediary node 30A implies the creation of an encrypted data tunnel, securely and privately connecting the user computer 10 and the first intermediary node 30A.

At step 209, the first processor processes the data packet 12 in order to render the data packet 12 suitable for transmission over an encrypted data tunnel. Accordingly, at step 210, the payload portion 12A and the original header portion 12B of the data packet 12 are encapsulated, in-line with well-known tunneling protocols, followed by the addition of a new outer header—a first outer header 12C—on top of the payload portion 12A and the original header portion 12B, thereby causing the original header portion 12B to be rearranged as an inner header (also referenced using the reference numeral 12B). In accordance with the present disclosure, the first outer header 12C designates the first intermediary node 30A as the intermediate destination of the data packet, whereas, in contrast, the inner header 12B (formerly the original header portion 12B) designates the server 20 as the 'final destination' of the data packet 12, with the 'source' of the data packet 12 being the common factor in the 'source IP address' field of both the inner header 12B and the (newly created) outer header 12C, at least when the data packet 12 is transmitted from the user computer 10 to the first intermediary node 30A. Subsequently, the payload portion 12A of the data packet is encrypted using the end-to-end key cryptographically linked to the server 20 since the payload portion 12A is purported to be analyzed only by the server 20. Subsequently, at step 210, the inner header 12B is encrypted using the next-hop key cryptographically linked to the first intermediary node 30A, since the first intermediary node 30A is purported to be one of the (intermediary) nodes that forwards the data packet 12 towards the server 20, after identifying the server 20 as the 'final destination' for the data packet 12, based on an analysis of the inner header 12A. At step 211, the data packet 12 incorporating the first outer header 12C, encrypted inner header 12B, and encrypted payload portion 12A is transmitted from the user computer 10 to the first intermediary node 30A over the encrypted tunnel established therebetween.

At step 212, the first intermediary node 30A is triggered to receive the data packet 12 transmitted over the encrypted tunnel from the user computer 10. Soon after receiving the data packet 12, the first intermediary 30A discards the first outer header 12C (prepended to the data packet 12 at the user computer 10), and decrypts only the inner header 12B—while maintaining the encryption of the payload portion 12A—of the received data packet 12 using the next-hop key (Key A) cryptographically linked to the first intermediary node 30, given the symmetric functionality of the said next-hop key. Subsequently, the second processor installed within the first intermediary node 30A identifies, based on an analysis of the decrypted inner header 12B, the server 20 as the final destination of the data packet 12. Subsequently, the second processor consults a routing table stored within the first intermediary node 30A and determines, from the routing table, if the final destination of the data packet 12, i.e., the server 20, is one-hop away from the first intermediary node 30A.

In accordance with the present disclosure, if the server 20 is determined to be one-hop away from the first intermediary node 30A, then the execution flow of the method shifts from step 212 to a series of steps 212G-212L. When the server 20 is determined to be one-hop away from the first intermediary node 30A, at step 212G, the second processor determines that the next-hop for the data packet 12 from the first intermediary node 30A provides for the data packet 12 to reach the server 20. Subsequently, at step 212H, the second processor generates a new (third) outer header 12E as a replacement of the (discarded) first outer header 12C, instead of the second outer header 12D (created at step 212E). The third outer header 12E designates the first intermediary node 30A as the 'source' of the data packet 12, and the server 20 as the 'final destination' of the data packet 12, while the inner header 12B continues to designate the user computer 10 as the (original) source of the data packet 12 and the server 20 as the 'final destination' of the data packet. In this case, since the data packet is transmitted from the first intermediary node 30A directly (by one-hop) to the server 20, the 'destination IP address' fields of both the inner header 12B and the third outer header 12E store the IP address of the server 20. Subsequently, at step 212I, the new (third) outer header 12E is prepended to the payload portion 12A and the inner header 12B of the data packet. At step 212J, the inner header 12B of the data packet is re-encrypted using the next-hop-destination key cryptographically linked to the server 20, since the server 20 is purported to be decrypting and subsequently processing the inner header 12B. Meanwhile, the encryption of the payload portion 12A of the data packet 12 is maintained. Subsequently, at step 212K, the data path—which previously connected the user computer 10 and the first intermediary node 30A via the corresponding encrypted data tunnel—is incrementally extended by one-hop, by the inclusion of the server 20 thereto, and another encrypted tunnel connecting the first intermediary node 30A and the server 20 is created as a consequence of the (incremental) extension of the data path. Subsequently, the data packet 12—comprising the third outer header 12E, encrypted payload portion 12A, and re-encrypted inner header 12B—is transmitted from the first intermediary node 30A to the server 20 over the encrypted tunnel established therebetween.

Further, at step 212L, the data packet 12 transmitted from the first intermediary node 30A is received at and processed by the server 20, the final destination for the data packet 12. Preferably, the server 20 discards the third outer header 12E, decrypts the inner header 12B (re-encrypted at the first intermediary node 30A) using the next-hop-destination key cryptographically linked to the server 20, and decrypts the payload portion 12A of the data packet 12, using the end-to-end key cryptographically linked to the server 20. Subsequently, the server 20 processes the data embedded within the payload portion 12A of the data packet 12 and typically executes pre-determined, appropriate computerized functions based on the processed data.

In accordance with the present disclosure, if the server 20 is determined not to be one-hop away from the first intermediary node 30A, then the execution flow of the method shifts from step 212 to a series of steps 212A-212F (instead of the steps 212G-212L). At step 212A, the second processor identifies, based on the execution of predetermined load-balancing algorithm, a second set of intermediary nodes (excluding the first intermediary node), among the plurality of intermediary nodes 30B-30J, one-hop away from the first intermediary node 30A. The nodes one-hop away from the first intermediary node 30A are designated as usable for facilitating the next-hop for the data packet 12 from the first intermediary node 30A. At step 212B, one intermediary node among the second set of intermediary nodes is selected at random, for facilitating the next-hop for the data packet 12 from the first intermediary node 30A, and the intermediary node thus selected is identified as the second intermediary node 30B. Subsequently, at step 212C, the data path—which previously connected the user computer 10 and the first intermediary node 30A via the corresponding encrypted data tunnel—is incrementally extended by one-hop, by the inclusion of the second intermediary node 30B thereto.

At step 212D, subsequent to the incremental extension of the data path, the decrypted inner header 12B is re-encrypted by the second processor (installed within the first intermediary node 30A) using a next-hop key cryptographically linked to the second intermediary node 30B, since the second intermediary node 30B is purported, in a subsequent step, to be decrypting the inner header 12B and forwarding the data packet 12 to the 'final destination' specified therein (i.e., server 20). All the while, the encryption of the payload portion 12A is maintained. Subsequently, at step 212E, the second processor generates a second outer header 12D as a replacement for the discarded first outer header 12C and prepends the second outer header 12D to the encrypted payload portion 12A and re-encrypted inner header 12B.

The second outer header 12D (prepended to the data packet 12) designates the first intermediary node 30A as the 'source' of the data packet 12, and the second intermediary node 30B as the intermediate destination of the data packet 12, whereas the re-encrypted inner header 12B of the data packet 12 continues to designate the user computer 10 as the original source and the server 20 as the final destination of the data packet 12. Subsequently, at step 212E, the data packet 12 comprising the second outer header 12D, re-encrypted inner header 12B and encrypted payload portion 12A is transmitted from the first intermediary node 30A to the second intermediary node 30B over the encrypted tunnel established therebetween, as a consequence of incremental extension of the data path from the first intermediary node 30A to the second intermediary node 30B. Further, at step 212F, the second intermediary node 30B receives the data packet 12—comprising the re-encrypted inner header 12B and encrypted payload portion 12A—from the first intermediary node 30A, and processes the (received) data packet. A third processor installed within the second intermediary node 30B discards the second outer header 12D—previously prepended to the data packet 12 at the first intermediary node 30A prior to the transmission of the data packet 12—and while maintaining the encryption of the payload portion 12A, decrypts only the inner header 12A of the (received) data packet 12 using the next-hop key cryptographically linked to the second intermediary node 30B. The third processor subsequently identifies, basis the decrypted inner header 12B, the server 20 as the 'final destination' of the data packet 12. Further, the third processor consults a routing table stored within the second intermediary node 30B, and basis the contents of the (aforementioned) routing table—which lists the nodes one-hop away from the second intermediary node 30B—and the execution of predetermined packet routine rules, determines whether the server 20 is one-hop away from the second intermediary node 30B.

While identifying the server 20 to be one-hop away (as per the aforementioned routing table) from the second intermediary node 30B, the third processor, in parallel, ascertains that the next-hop for the data packet 12 facilitates a direct transmission thereof to the server 20. If the server 20 is determined to be one-hop away from the second intermediary node 30B, the third processor re-executes, as indicated in FIG. 2B, the steps 212G-212L albeit with the below mentioned procedural modifications. The third processor generates a new (fourth) header 12F as a replacement for the discarded second outer header 12D, with the fourth outer header 12F designating the second intermediary node 30B as the 'source' of the data packet 12 and the server 20 as the 'final destination' of the data packet 12. Here, it is pertinent to note that the third outer header 12E is created only when the data packet 12 is transmitted from the first intermediary node 30A to the server 20, and since in this case, the data packet 12 is transmitted from the second intermediary node 30B to the server 20, the fourth outer header 12F is created.

The (decrypted) inner header, meanwhile, continues to designate the user computer 10 as the (original) source of the data packet 12 and the server 20 as the 'final destination' of the data packet. Subsequently, the fourth outer header 12F is prepended to the payload portion 12A and the inner header 12B of the data packet, and the inner header 12B of the data packet is re-encrypted using the next-hop-destination key cryptographically linked to the server 20, since the server 20 is purported to be decrypting and subsequently processing the inner header 12B. Meanwhile, the third processor maintains the encryption of the payload portion 12A of the data packet 12. Subsequently, the data path—which previously connected the user computer 10, the first intermediary node 30A and the second intermediary node 30B via the corresponding encrypted data tunnels—is incrementally extended by one-hop through the inclusion of the server 20 thereto, and yet another encrypted tunnel connecting the second intermediary node 30B to the server 20 is created as a consequence of the (incremental) extension of the data path. Further, the data packet 12—comprising the fourth outer header 12F, encrypted payload portion 12A, and re-encrypted inner header 12B—is transmitted from the second intermediary node 30B to the server 20 over the encrypted tunnel established therebetween.

However, in step 212F, if the server 20 is determined (by the third processor) as not being one-hop away from the second intermediary node 30B (in an event when the routing table of the second intermediary node 30B does no store the IP address of the server 20), the execution flow of the method is tweaked (as illustrated in step 214) such that the next-hop for the data packet 12 is iteratively determined from every intermediary node (except the intermediary nodes 30A and 30B given their prior-use) based on a consultation with corresponding routing tables and iterative execution of the predetermined packet routing rules, until the data packet 12 is determined to have reached an exit node 30J located one-hop away from the server 20. Preferably, the data packet 12 is determined to have reached an intermediary node (exit node 30J) one-hop away from the server 20, based on the consultation and analysis of the routing table stored within the exit node 30J.

Further, the data path which till now facilitated, via respective encrypted data tunnels, a connection between the user computer 10, first intermediary node 30A, and second intermediary node 308, is iteratively extended, one-hop and one intermediary node at a time, until the data packet 12 is determined to have reached an exit node 30J located one-hop away from the server 20. Accordingly, at each such intermediary node through which the data path is iteratively and incrementally extended, an outer header carried along from the previous intermediary node is discarded and a new outer header specifying new 'source' and a new 'destination'—either yet another intermediary node or the server 20—is prepended to the data packet 12, while maintaining the encryption of the payload portion 12A of the data packet 12 intact. Additionally, at each such intermediary node through which the data path is iteratively and incrementally extended, the inner header 12B of the data packet 12 is decrypted using a next-hop key cryptographically linked to the intermediary node that received the data packet 12, in order to facilitate identification of the 'final destination' of the data packet 12. Subsequently, at each such intermediary node, the inner header 12B is re-encrypted using a next-hop key cryptographically linked to the intermediary node to which the data packet 12 is purported to be transmitted.

In accordance with the present disclosure, when the data packet 12 transmitted along the incrementally extended data path reaches the exit node 30J determined to be one-hop away from the server 20, a fourth processor installed within the exit node 30J, while maintaining the encryption of the payload portion 12A, discards the outer header previously prepended to the data packet 12 at the intermediary node preceding the exit node by one-hop. Additionally, the fourth processor decrypts the inner header 12A of the (received) data packet 12 using the next-hop key cryptographically linked to the exit node 30J, and consequentially determines, based on an analysis of the decrypted inner header 12B, that the next-hop for the data packet 12 constitutes a transmission thereof directly to the server 20. Accordingly, the exit node 30J generates a fifth outer header 12G that designates the exit node as the 'source' of the data packet 12 and server 20 as the 'destination' of the data packet 12. The inner header (decrypted at the exit node 30J) continues to designate the user computer 10 as the (original) source of the data packet 12 and the server 20 as the 'final destination' of the data packet. Subsequently, the fifth outer header 12G is prepended to the payload portion 12A and the inner header 12B of the data packet, and the inner header 12B of the data packet is re-encrypted using the next-hop-destination key cryptographically linked to the server 20, since the server 20 is purported to be decrypting and subsequently processing the inner header 12B.

Subsequently, the data path—which previously connected the user computer 10, the first intermediary node 30A, and the second intermediary node 30B with the exit node 30J via a plurality of other intermediary nodes—is incrementally extended by one-hop through the inclusion of the server 20 thereto, and yet another encrypted tunnel connecting the exit node 30J to the server 20 is created as a consequence of the (incremental) extension of the data path. Further, the data packet 12—comprising the fifth outer header 12F, encrypted payload portion 12A, and re-encrypted inner header 12B—is transmitted from the exit node 30B to the server 20 over the encrypted tunnel established therebetween. Finally, the server 20 receives the data packet and begins processing of the received data packet 12 by discarding the fifth outer header 12 prepended at the exit node 30J to the data packet. Subsequently, the server 20 decrypts the inner header 12B (re-encrypted at the exit node 30J) using the next-hop-destination key cryptographically linked to the server 20, and the payload portion 12A of the data packet 12, using the end-to-end key cryptographically linked to the server 20.

The server 20 consequentially processes the data embedded within the payload portion 12A of the data packet 12.

Technical Advantages

The technical advantages envisaged by the present disclosure include the realization of a computer-implemented system, method and computer program product for maintaining the anonymity of a communication network transmitting sensitive data. The (computer-implemented) system, method and the computer program product envisaged by the present disclosure are applicable, in an exemplary sense, to a computer network configured using hub-spoke architecture. The system, method, and the computer program product envisage randomizing a network path and in turn the intermediary link nodes to be traversed by a data packet—during transmission of the data packet from a source node to a destination node—thereby ensuring that (any) possible traffic analysis based network attack is thwarted since a concrete network path for the transmission of the data packet could never be adequately inferred by a network attacker despite having (unauthorized) access to any intermediate link node receiving and processing the said data packet during the transmission thereof. Further, the system, method and computer program product envisaged by the present disclosure also propose encrypting both the payload portion as well as the non-payload portion of a data packet, thereby ensuring that both the payload portion and the non-payload portion are immune to traffic analysis. Given the fact that traffic analysis based network attacks are largely based on the information snooped from data packet headers (referred to as 'header portion' in this document), the system, method and computer program product emphasize upon protecting the packet headers from being subjected to unauthorized access, and consequential snooping.

Additionally, the system, method and the computer program product envisaged by the present disclosure abstains from constructing the entire network path (data path)—a prerequisite for initiating transmission of a data packet from a source node to a destination node—at a single instance, and instead constructs the network path, one hop, i.e., by incorporating one node, at a time and increments the (length of the) network path one hop (one node) at a time. By incrementally constructing the network path, the system (as well as the method and the computer program product) ensures that the direction and the length of the network path remains unpredictable and is bound to change at random time intervals with incremental addition of every intermediary link node, and that no network attacker having a view of only a portion of a communication network or for that matter having a view and control of only one intermediary link node, is unable to accurately and completely infer the purported network path and consequentially launch an attack on (a) destination node which would have been inferred by the network attacker as receiving data packets incorporating sensitive data.

Additionally, the system, method and the computer program product envisaged by the present disclosure pre-empts the proposition of tracing an entrance point to an otherwise anonymous network by performing a traffic analysis on an intermediary node to identify and track the data packets received therein, and infer, based on the traffic analysis of the intermediary node, the path likely to have been traversed by the data packets to arrive at the said intermediary node and consequentially, based on the inferred path, trace the entrance point (entrance node) to the (anonymous) communication network from where the data packets are likely to have entered the communication network. Since the present disclosure envisages incremental construction of a network path, no intermediary node at any point of time is made aware of the source of a data packet and the final destination of (the) data packet. Instead, every intermediary node forming a part of an incrementally constructed network path is made aware only a preceding intermediary node that transmitted a (particular) data packet, with the succeeding intermediary node designated as the next-hop for the (particular) data packet selected at random and preferably just-in-time to facilitate transmission. In such a case, since every node is informed about only a preceding intermediary node that transmitted the data packet, and since the network path is extended one node at a time to facilitate only one hop of the data packet, a network attacker having a view and control of one particular intermediary node would be rendered incapable of inferring the complete network path, and theretofore the destination for (the) data packet (incorporating sensitive data) as well as an entrance node (source endpoint device) from which the data packet entered the (anonymous) communication network.

Further, the system, method and the computer program product envisaged by the present disclosure, whilst protecting the entire data packet by facilitating encryption of both the payload portion and non-payload portion thereof, also absolves the intermediary nodes interconnecting a source node and a destination of the data packet from the responsibility of decrypting and re-encrypting the entire data packet, thereby bringing about an improvement in the operational performance of the intermediary nodes. The system, method and the computer program product enables the intermediary nodes to decrypt and re-encrypt only an inner header of the data packet while maintaining the encryption of the payload portion of the data packet, thereby preventing the intermediary nodes from needlessly decrypting and re-encrypting the entire data packet, which indeed was the case with the prior-art data security solutions. Additionally, a communication network employing either the system or the method or the computer program product of the present disclosure is rendered resilient to network failures, since, in accordance with the present disclosure, more than one intermediary node is always rendered available for carrying the data traffic from a source node to a destination node, given that the data path interconnecting the source node and the destination node via a plurality of intermediary nodes is always construed in an incremental manner, at random and just-in-time to facilitate the transmission of the data packet from one node to another, thereby ensuring that a failure of one of the intermediary nodes does not affect the construction of the entire data path, and is always compensated for by the selection of another intermediary node, which is in turn used for incrementally extending the data path, instead of the failed node. Further, the implementation of the system, method and the computer program product envisaged by the present disclosure, on a communication network causes the communication network to employ active-standby mechanism which in turn involves designating every node of the communication network as an active node and consequentially rendering every node of the communication network available at point of time for facilitating a data transfer—as opposed to the implementation of conventional active-standby mechanism which in turn provides for one node to be held on a standby for every node transmitting the data traffic, thereby causing the standby node to remain idle and not take any part in data transmission until the corresponding active node witnesses a failure—thereby maximizing the throughput and the efficiency of the communication network.

What is claimed is:

1. A computer-implemented method for facilitating secured data communication between a source endpoint device and a destination endpoint device connectable via a plurality of intermediary nodes using a hub-spoke connection configuration, said method comprising the following computer-implemented steps:

on identification of at least one data packet as originating from said source endpoint device and designating said destination endpoint device as a final destination thereof:

calculating an end-to-end key and a next-hop-destination key linkable only to said destination endpoint device, and cryptographically linking said end-to-end key and said next-hop-destination key to said destination endpoint device;

calculating a plurality of next-hop keys, each of said plurality of next-hop keys corresponding respectively to each of said plurality of intermediary nodes usable for connecting said source endpoint device with said destination endpoint device, and cryptographically linking each of said plurality of next-hop keys only to corresponding intermediary nodes;

identifying a first set of intermediary nodes among said plurality of intermediary nodes, such that each of said first set of intermediary nodes are one-hop away from said source endpoint device, and such that each of said first set of intermediary nodes constitute a first-hop for said data packet from said source endpoint device, and are usable for directing said data packet through to said destination endpoint device;

selecting, at random, one intermediary node from said first set of intermediary nodes, and designating selected intermediary node as a first intermediary node constituting said first-hop for said data packet from said source endpoint device;

incrementally constructing a data path, one-hop at a time, by communicably coupling said source endpoint device and said first intermediary node, and configuring said data path to facilitate said first-hop for said data packet from said source endpoint device to said first intermediary node;

subsequent to identification of said first-hop, triggering said source endpoint device to:

create a first outer header indicating said source endpoint device as a source of said data packet, and said first intermediary node as an intermediate destination for said data packet;

prepend said first outer header to a header portion and payload portion of said data packet, such that said header portion becomes an inner header for said data packet; and encrypt said inner header using a next-hop key cryptographically linked to said first intermediary node, and encrypt said payload portion using said end-to-end key; and initiate transmission of said data packet along said data path, basis said first outer header, from said source endpoint device to said first intermediary node;

triggering said first intermediary node to receive said data packet transmitted from said source endpoint device, and:

discard said first outer header, while decrypting only said inner header using said first next-hop key, and maintaining encryption of said payload portion;

identify, based on an analysis of decrypted inner header, said destination endpoint device as said final destination for said data packet;

based on an identification of said destination endpoint device as said final destination of said data packet, and based on said predetermined packet routing rules, determine, if said destination endpoint device is one-hop away from said first intermediary node;

in an event said destination endpoint device is determined not to be one-hop away from said first intermediary node, further triggering said first intermediary node to:

identifying a second set of intermediary nodes among said plurality of intermediary nodes, such that each of said second set of intermediary nodes are said one-hop away from said first intermediary node, and such that each of said second set of intermediary nodes constitute said next-hop for said data packet from said first intermediary node, and are usable for directing said data packet through to said destination endpoint device;

select, at random, one intermediary node from said second set of intermediary nodes, and designate selected intermediary node as a second intermediary node constituting said next-hop for said data packet from said first intermediary node;

incrementally extend said data path, one-hop at a time, from said first intermediary node to said second intermediary node, by incorporating said next-hop thereto;

re-encrypt said inner header using a next-hop key cryptographically linked to said second intermediary node, while maintaining encryption of said payload portion;

generate a second outer header indicating said first intermediary node as a source of said data packet, and said second intermediary node as an intermediate destination for said data packet;

prepend said second outer header onto said inner header and said payload portion of said data packet; and initiate transmission of said data packet along said data path, from said first intermediary node to said second intermediary node, basis said second outer header;

in an event said destination endpoint device is determined to be one-hop away from said first intermediary node, triggering said first intermediary node to:

determine that said next-hop for said data packet from said first intermediary node constitutes transmission of said data packet onto said destination endpoint device;

generate a third outer header describing said first intermediary node as said source of said data packet, and said destination endpoint device as said final destination for said data packet;

prepend said third outer header onto said inner header and payload portion of said data packet;

re-encrypt said inner header using said next-hop-destination key cryptographically linked to said destination endpoint device, while maintaining encryption of said payload portion;

incrementally extend said data path, one-hop at a time, from said first intermediary node to said destination endpoint device, by incorporating said next-hop onto said data path; and initiate transmission of said data packet along said data path, basis said third outer header, from said first intermediary node to said destination endpoint device;

triggering said destination endpoint device to receive said data packet, and:

decrypt said inner header using said next-hop-destination key cryptographically linked to said destination endpoint device, and decrypt said payload portion using said end-to-end key cryptographically linked to said destination endpoint device; and process decrypted payload portion of said data packet.

2. The method as claimed in claim 1, wherein the step of triggering said first intermediary node to transmit said data packet to said second intermediary node, further includes the following steps:

triggering said secondary intermediary node to:

receive and process said data packet;

discard said second outer header, while decrypting only said inner header using said next-hop key cryptographically linked to said second intermediary node, and while maintaining encryption of said payload portion;

identify, based on an analysis of said decrypted inner header, said destination endpoint device as said final destination for said data packet; and based on said predetermined packet routing rules, determine, if said destination endpoint device is one-hop away from said second intermediary node;

in an event said destination endpoint device is determined to be one-hop away from said second intermediary node, triggering said second intermediary node to:

determine that said next-hop for said data packet, from said second intermediary node, constitutes transmission of said data packet onto said destination endpoint device;

generate a fourth outer header describing said second intermediary node as said source of said data packet, and said destination endpoint device as said final destination for said data packet;

prepend said fourth outer header onto said inner header and payload portion of said data packet;

re-encrypt said inner header using said next-hop-destination key, while maintaining encryption of said payload portion;

incrementally extend said data path, one-hop at a time, from said second intermediary node to said destination endpoint device, by incorporating said next-hop onto said data path; and initiate transmission of said data packet along said data path, basis said second outer header, from said second intermediary node to said destination endpoint device;

in an event said destination endpoint is determined not to be one-hop away from said second intermediary node:

iteratively determining said next-hop for said data packet, from said second intermediary node, wherein said next-hop for said data packet is iteratively determined until said data packet is identified, at least based on said predetermined packet routing rules, as having reached an exit node one-hop away from said destination endpoint device; and incrementally extending said data path, one-hop at a time, until said data path connects said second intermediary node with said exit node determined to be said one-hop away from said destination endpoint device, via at least some intermediary nodes randomly selected, one intermediary node at a time, from said plurality of intermediary nodes, and wherein each of said at least some intermediary nodes are located mutually one-hop away;

at each of said at least some intermediary nodes, discarding a previously prepended outer header and prepending a new outer header onto said inner header and payload portion of said data packet, said new outer header describing an intermediary node from where said data packet originated, and said intermediate destination to which said data packet is bound;

at each of said at least some intermediary nodes, decrypting said inner header using a next-hop key cryptographically linked to an intermediary node receiving said data packet, for identifying said final destination of said data packet, and re-encrypting said inner header using a next-hop key cryptographically linked to an intermediate intermediary node to which said data packet is purported to be transmitted;

maintaining encryption of said payload portion throughout said transmission of said data packet from said second intermediary node to said exit node through said data path, and across said at least some intermediary node;

transmitting said data packet along said data path incrementally extended one-hop at a time, and from said second intermediary node to said exit node, through said at least some intermediary nodes randomly selected from said plurality of intermediary nodes; and triggering said exit node to:

receive said data packet from one of said at least some of intermediary nodes;

discard said previously prepended outer header;

decrypt said inner header using a next-hop key cryptographically linked to said exit node;

determine, based on an analysis of said decrypted outer header, said next-hop for said data packet to constitute a transmission thereof to said destination endpoint device;

generate a fifth outer header describing said exit node as said source of said data packet, and said destination endpoint device as said final destination for said data packet;

prepend said fifth outer header onto said inner header and payload portion of said data packet;

re-encrypt said inner header using said next-hop-destination key cryptographically linked to said destination endpoint device, while maintaining encryption of said payload portion;

incrementally extend said data path, one-hop at a time, from said exit node to said destination endpoint device, by incorporating said next-hop onto said data path; and initiate transmission of said data packet along said data path, basis said fifth outer header, from said exit node to said destination endpoint device.

3. The method as claimed in claim 1, wherein the method further includes the following steps:

storing said end-to-end key and said next-hop-destination key cryptographically linked to said destination endpoint device, in an encryption server communicably coupled at least to said destination endpoint device, and wherein said end-to-end key and said next-hop-destination key are accessible via a predetermined key distribution management scheme executed on at least one of said source endpoint device, destination endpoint device and said exit node; and storing each of said plurality of next-hop keys in said encryption server, and communicably coupling said encryption server with each of said plurality of intermediary nodes, thereby enabling each of said plurality of intermediary nodes to trigger said encryption server, via execution of said predetermined key distribution management scheme, for a transfer of said plurality of next-hop keys corresponding to each of said plurality of intermediary nodes.

4. The method as claimed in claim 3, wherein the method further includes the step of triggering said encryption server to share with said source endpoint device, a next-hop key cryptographically linked to said first intermediary node, only in an event said first intermediary node is directly coupled to said source endpoint device.

5. The method as claimed in claim 1, wherein the method further includes the step of triggering said encryption server to share said end-to-end key with only said source endpoint device and said destination endpoint device, thereby enabling said source endpoint device to encrypt said payload portion using said end-to-end key, and said destination endpoint device to decrypt said payload portion using said end-to-end key.

6. The method as claimed in claim 1, wherein the method further includes the step of iteratively re-encrypting said inner header using each of said next-hop keys cryptographically linked to each of said plurality of intermediary nodes selected at random for incrementally extending said data path, while maintaining encryption of said payload portion.

7. The method as claimed in claim 1, wherein the step of triggering said source endpoint device to create a first outer header further includes the step of selectively encapsulating said header portion and said payload portion, prior to creating said first outer header.

8. The method as claimed in claim 1, wherein the step of triggering said first intermediary node to decrypt said inner header, further includes the step of triggering said first intermediary node to decapsulate said inner header and said payload portion, prior to decrypting said inner header.

9. A computer-implemented system for facilitating secured data communication between a source endpoint device and a destination endpoint device connectable via a plurality of intermediary nodes using a hub-spoke connection configuration, said system comprising:

at least one processor;

at least one memory module storing computer program code, and communicably coupled to said processor, wherein said memory module and stored computer program are configured, with said processor, to cause said computer-implemented system to:

on identification of at least one data packet as originating from said source endpoint device and directed to said destination endpoint device:

calculate an end-to-end key and a next-hop-destination key linkable only to said destination endpoint device, and cryptographically linking said end-to-end key and said next-hop-destination key to said destination endpoint device;

calculate a plurality of next-hop keys, each of said plurality of next-hop keys corresponding respectively to each of said plurality of intermediary nodes usable for connecting said source endpoint device with said destination endpoint device, and cryptographically link each of said plurality of next-hop keys only to corresponding intermediary nodes;

identify a first set of intermediary nodes among said plurality of intermediary nodes, such that each of said first set of intermediary nodes are one-hop away from said source endpoint device, and such that each of said first set of intermediary nodes constitute a first-hop for said data packet from said source endpoint device, and are usable for directing said data packet through to said destination endpoint device;

select, at random, one intermediary node from said first set of intermediary nodes, and designating selected intermediary node as a first intermediary node constituting said first-hop for said data packet from said source endpoint device;

incrementally construct a data path, one-hop at a time, by communicably coupling said source endpoint device and said first intermediary node, and configure said data path to facilitate said first-hop for said data packet from said source endpoint device to said first intermediary node;

subsequent to identification of said first-hop, trigger said source endpoint device to:

create a first outer header indicating said source endpoint device as a source of said data packet, and said first intermediary node as an intermediate destination for said data packet;

prepend said first outer header to a header portion and payload portion of said data packet, such that said header portion becomes an inner header for said data packet; and encrypt said inner header using a next-hop key cryptographically linked to said first intermediary node, and encrypt said payload portion using said end-to-end key; and initiate transmission of said data packet along said data path, basis said first outer header, from said source endpoint device to said first intermediary node;

trigger said first intermediary node to receive said data packet transmitted from said source endpoint device, and:

discard said first outer header, while decrypting only said inner header using said first next-hop key, and maintaining encryption of said payload portion;

identify, based on an analysis of decrypted inner header, said destination endpoint device as said final destination for said data packet;

based on an identification of said destination endpoint device as said final destination of said data packet, and based at least on said predetermined packet routing rules, determine, if said destination endpoint device is one-hop away from said first intermediary node;
in an event said destination endpoint device is determined not to be one-hop away from said first intermediary node, trigger said first intermediary node to:
identify a second set of intermediary nodes among said plurality of intermediary nodes, such that each of said second set of intermediary nodes are said one-hop away from said first intermediary node, and such that each of said second set of intermediary nodes constitute said next-hop for said data packet from said first intermediary node, and are usable for directing said data packet through to said destination endpoint device;
select, at random, one intermediary node from said second set of intermediary nodes, and designate selected intermediary node as a second intermediary node constituting said next-hop for said data packet from said first intermediary node;
incrementally extend said data path, one-hop at a time, from said first intermediary node to said second intermediary node, by incorporating said next-hop thereto;
re-encrypt said inner header using a next-hop key cryptographically linked to said second intermediary node, while maintaining encryption of said payload portion;
generate a second outer header indicating said first intermediary node as a source of said data packet, and said second intermediary node as an intermediate destination for said data packet;
prepend said second outer header onto said inner header and said payload portion of said data packet; and
initiate transmission of said data packet along said data path, from said first intermediary node to said second intermediary node;
in an event said destination endpoint device is determined to be one-hop away from said first intermediary node, trigger said first intermediary node to:
determine that said next-hop for said data packet from said first intermediary node constitutes transmission of said data packet onto said destination endpoint device;
generate a third outer header describing said first intermediary node as said source of said data packet, and said destination endpoint device as said final destination for said data packet;
prepend said third outer header onto said inner header and payload portion of said data packet;
re-encrypt said inner header using said next-hop-destination key cryptographically linked to said destination endpoint device, while maintaining encryption of said payload portion;
incrementally extend said data path, one-hop at a time, from said first intermediary node to said destination endpoint device, by incorporating said next-hop onto said data path; and
initiate transmission of said data packet along said data path, basis said second outer header, from said first intermediary node to said destination endpoint device;
trigger said destination endpoint device to receive said data packet, and:
discard said third outer header;
decrypt said inner header using said next-hop-destination key cryptographically linked to said destination endpoint device, and decrypt said payload portion using said end-to-end key cryptographically linked to said destination endpoint device; and
process decrypted payload portion of said data packet.

10. The system as claimed in claim 9, wherein said system is further configured to:
trigger said second intermediary node to receive said data packet from said first intermediary node, and process said data packet, and:
discard said second outer header, while decrypting only said inner header using said next-hop key cryptographically linked to said second intermediary node, and while maintaining encryption of said payload portion;
identify, based on an analysis of said decrypted inner header, said destination endpoint device as said final destination for said data packet; and
based on said predetermined packet routing rules, determine, if said destination endpoint device is one-hop away from said second intermediary node;
in an event said destination endpoint device is determined to be one-hop away from said second intermediary node, said system configured to trigger said second intermediary node to:
determine that said next-hop for said data packet, from said second intermediary node, constitutes transmission of said data packet onto said destination endpoint device;
generate a fourth outer header describing said second intermediary node as said source of said data packet, and said destination endpoint device as said final destination for said data packet;
prepend said fourth outer header onto said inner header and payload portion of said data packet;
re-encrypt said inner header using said next-hop-destination key, while maintaining encryption of said payload portion;
incrementally extend said data path, one-hop at a time, from said second intermediary node to said destination endpoint device, by incorporating said next-hop onto said data path; and
initiate transmission of said data packet along said data path, basis said second outer header, from said second intermediary node to said destination endpoint device;
in an event said destination endpoint is determined not to be one-hop away from said second intermediary node, said system configured to:
iteratively determine said next-hop for said data packet, from said second intermediary node, wherein said next-hop for said data packet is iteratively determined until said data packet is identified, at least based on said predetermined packet routing rules, as having reached an exit node one-hop away from said destination endpoint device; and incrementally extend said data path, one-hop at a time, until said data path connects said second intermediary node with said exit node determined to be said one-hop away from said destination endpoint device, via at least some intermediary nodes randomly selected, one intermediary node at a time, from said plurality of intermediary nodes, and wherein each of said at least some intermediary nodes are located mutually one-hop away;

at each of said at least some intermediary nodes, discard a previously prepended outer header and prepend a new outer header onto said inner header and payload portion of said data packet, said new outer header describing an intermediary node from where said data packet originated and said intermediate destination to which said data packet is bound;

at each of said at least some intermediary nodes, decrypt said inner header using a next-hop key cryptographically linked to an intermediary node that received said data packet, for identifying said final destination of said data packet, and re-encrypt said inner header using a next-hop key cryptographically linked to an intermediary node to which said data packet is purported to be transmitted;

maintain encryption of said payload portion throughout said transmission of said data packet from said second intermediary node to said exit node through said data path, and across said at least some intermediary node;

initiate transmission of said data packet along said data path incrementally extended one-hop at a time, and from said second intermediary node to said exit node, through said at least some intermediary nodes randomly selected from said plurality of intermediary nodes; and said system further configured to trigger said exit node to:
receive said data packet from one of said at least some of intermediary nodes;
discard said previously prepended outer header;
decrypt said inner header using a next-hop key cryptographically linked to said exit node;
determine, based on an analysis of said decrypted outer header, said next-hop for said data packet to be constituting a transmission thereof to said destination endpoint device;
generate a fifth outer header describing said exit node as said source of said data packet, and said destination endpoint device as said final destination for said data packet;
prepend said fifth outer header onto said inner header and payload portion of said data packet;
re-encrypt said inner header using said next-hop-destination key cryptographically linked to said destination endpoint device, while maintaining encryption of said payload portion;
incrementally extend said data path, one-hop at a time, from said exit node to said destination endpoint device, by incorporating said next-hop onto said data path; and
initiate transmission of said data packet along said data path, basis said fifth outer header, from said exit node to said destination endpoint device.

11. The system as claimed in claim 9, wherein said system further includes an encryption server, said encryption server configured communicably coupled to said source endpoint device, said destination endpoint device and said plurality of intermediary nodes, said encryption server responsive to a predetermined key distribution function, said encryption server configured to:
store said end-to-end key and said next-hop-destination key cryptographically linked to said destination endpoint device, and selectively render said end-to-end key and said next-hop-destination key accessible to at least one of said source endpoint device, destination endpoint device and said exit node; and
store each of said plurality of next-hop keys, and render each of said next-hop keys accessible to said corresponding intermediary nodes, in response to execution of said predetermined key distribution management scheme, on each of said plurality of intermediary nodes.

12. The encryption server as claimed in claim 11, wherein said encryption server is configured to render a next-hop key cryptographically linked to said first intermediary node, accessible to said source endpoint device, only in an event said first intermediary node is directly coupled to said source endpoint device.

13. The system as claimed in claim 9, wherein said processor is further configured to iteratively re-encrypt said inner header using each of said next-hop keys cryptographically linked to each of said plurality of intermediary nodes selected at random for incrementally extending said data path, while maintaining encryption of said payload portion.

14. The system as claimed in claim 9, wherein said processor is further configured to:
trigger said source endpoint device to selectively encapsulate said header portion and said payload portion, prior to creation of said first outer header; and
trigger said first intermediary node to decapsulate said inner header and said payload portion, prior to decryption of said inner header.

15. A non-transitory computer readable storage medium having computer-readable instructions stored thereupon, said computer-readable instructions, when executed by a computer processor, cause the computer processor to:
identify at least one data packet as originating from said source endpoint device and directed to said destination endpoint device, and:
calculate an end-to-end key and a next-hop-destination key linkable only to said destination endpoint device, and cryptographically linking said end-to-end key and said next-hop-destination key to said destination endpoint device;
calculate a plurality of next-hop keys, each of said plurality of next-hop keys corresponding respectively to each of said plurality of intermediary nodes usable for connecting said source endpoint device with said destination endpoint device, and cryptographically link each of said plurality of next-hop keys only to corresponding intermediary nodes;
identify a first set of intermediary nodes among said plurality of intermediary nodes, such that each of said first set of intermediary nodes are one-hop away from said source endpoint device, and such that each of said first set of intermediary nodes constitute a first-hop for said data packet from said source endpoint device, and are usable for directing said data packet through to said destination endpoint device;
select, at random, one intermediary node from said first set of intermediary nodes, and designating selected intermediary node as a first intermediary node constituting said first-hop for said data packet from said source endpoint device;

incrementally construct a data path, one-hop at a time, by communicably coupling said source endpoint device and said first intermediary node, and configure said data path to facilitate said first-hop for said data packet from said source endpoint device to said first intermediary node;

subsequent to identification of said first-hop, trigger said source endpoint device to:
create a first outer header indicating said source endpoint device as a source of said data packet, and said first intermediary node as an intermediate destination for said data packet;
prepend said first outer header to a header portion and payload portion of said data packet, such that said header portion becomes an inner header for said data packet; and
encrypt said inner header using a next-hop key cryptographically linked to said first intermediary node, and encrypt said payload portion using said end-to-end key; and
initiate transmission of said data packet along said data path, basis said first outer header, from said source endpoint device to said first intermediary node;

trigger said first intermediary node to receive said data packet transmitted from said source endpoint device, and:
discard said first outer header, while decrypting only said inner header using said first next-hop key, and maintaining encryption of said payload portion;
identify, based on an analysis of decrypted inner header, said destination endpoint device as said final destination for said data packet;
based on an identification of said destination endpoint device as said final destination of said data packet, and based at least on said predetermined packet routing rules, determine, if said destination endpoint device is one-hop away from said first intermediary node;
in an event said destination endpoint device is determined not to be one-hop away from said first intermediary node, trigger said first intermediary node to:
identify a second set of intermediary nodes among said plurality of intermediary nodes, such that each of said second set of intermediary nodes are said one-hop away from said first intermediary node, and such that each of said second set of intermediary nodes constitute said next-hop for said data packet from said first intermediary node, and are usable for directing said data packet through to said destination endpoint device;
select, at random, one intermediary node from said second set of intermediary nodes, and designate selected intermediary node as a second intermediary node constituting said next-hop for said data packet from said first intermediary node;
incrementally extend said data path, one-hop at a time, from said first intermediary node to said second intermediary node, by incorporating said next-hop thereto;
re-encrypt said inner header using a next-hop key cryptographically linked to said second intermediary node, while maintaining encryption of said payload portion;
generate a second outer header indicating said first intermediary node as a source of said data packet, and said second intermediary node as an intermediate destination for said data packet;
prepend said second outer header onto said inner header and said payload portion of said data packet; and
initiate transmission of said data packet along said data path, from said first intermediary node to said second intermediary node;
in an event said destination endpoint device is determined to be one-hop away from said first intermediary node, trigger said first intermediary node to:
determine that said next-hop for said data packet from said first intermediary node constitutes transmission of said data packet onto said destination endpoint device;
generate a third outer header describing said first intermediary node as said source of said data packet, and said destination endpoint device as said final destination for said data packet;
prepend said third outer header onto said inner header and payload portion of said data packet;
re-encrypt said inner header using said next-hop-destination key cryptographically linked to said destination endpoint device, while maintaining encryption of said payload portion;
incrementally extend said data path, one-hop at a time, from said first intermediary node to said destination endpoint device, by incorporating said next-hop onto said data path; and
initiate transmission of said data packet along said data path, basis said second outer header, from said first intermediary node to said destination endpoint device;
trigger said destination endpoint device to receive said data packet, and:
discard said third outer header,
decrypt said inner header using said next-hop-destination key cryptographically linked to said destination endpoint device, and decrypt said payload portion using said end-to-end key cryptographically linked to said destination endpoint device; and
process decrypted payload portion of said data packet.

16. The non-transitory computer-readable storage medium as claimed in claim 15, wherein said computer-readable instructions, when executed by the computer processor, further cause the computer processor to:
trigger said second intermediary node to receive said data packet from said first intermediary node, and process said data packet, and:
discard said second outer header, while decrypting only said inner header using said next-hop key cryptographically linked to said second intermediary node, and while maintaining encryption of said payload portion;
identify, based on an analysis of said decrypted inner header, said destination endpoint device as said final destination for said data packet; and
based on said predetermined packet muting rules, determine, if said destination endpoint device is one-hop away from said second intermediary node;

in an event said destination endpoint device is determined to be one-hop away from said second intermediary node, trigger said second intermediary node to:
  determine that said next-hop for said data packet, from said second intermediary node, constitutes transmission of said data packet onto said destination endpoint device;
  generate a fourth outer header describing said second intermediary node as said source of said data packet, and said destination endpoint device as said final destination for said data packet;
  prepend said fourth outer header onto said inner header and payload portion of said data packet;
  re-encrypt said inner header using said next-hop-destination key, while maintaining encryption of said payload portion;
  incrementally extend said data path, one-hop at a time, from said second intermediary node to said destination endpoint device, by incorporating said next-hop onto said data path; and
  initiate transmission of said data packet along said data path, basis said second outer header, from said second intermediary node to said destination endpoint device;
in an event said destination endpoint is determined not to be one-hop away from said second intermediary node:
  iteratively determine said next-hop for said data packet, from said second intermediary node, wherein said next-hop for said data packet is iteratively determined until said data packet is identified, at least based on said predetermined packet routing rules, as having reached an exit node one-hop away from said destination endpoint device; and
  incrementally extend said data path, one-hop at a time, until said data path connects said second intermediary node with said exit node determined to be said one-hop away from said destination endpoint device, via at least some intermediary nodes randomly selected, one intermediary node at a time, from said plurality of intermediary nodes, and wherein each of said at least some intermediary nodes are located mutually one-hop away;
  at each of said at least some intermediary nodes, discard a previously prepended outer header and prepend a new outer header onto said inner header and payload portion of said data packet, said new outer header describing an intermediary node from where said data packet originated and said intermediate destination to which said data packet is bound;
  at each of said at least some intermediary nodes, decrypt said inner header using a next-hop key cryptographically linked to an intermediary node receiving said data packet, for identifying said final destination of said data packet, and re-encrypt said inner header using a next-hop key cryptographically linked to said intermediate destination to which said data packet is bound;
  maintain encryption of said payload portion throughout said transmission of said data packet from said second intermediary node to said exit node through said data path, and across said at least some intermediary node;
  initiate transmission of said data packet along said data path incrementally extended one-hop at a time, and from said second intermediary node to said exit node, through said at least some intermediary nodes randomly selected from said plurality of intermediary nodes; and
  trigger said exit node, and cause said exit node to:
    receive said data packet from one of said at least some of intermediary nodes;
    discard said previously prepended outer header;
    decrypt said inner header using a next-hop key cryptographically linked to said exit node;
    determine, based on an analysis of said decrypted outer header, said next-hop for said data packet to be constituting a transmission thereof to said destination endpoint device;
    generate a fifth outer header describing said exit node as said source of said data packet, and said destination endpoint device as said final destination for said data packet;
    prepend said fifth outer header onto said inner header and payload portion of said data packet;
    re-encrypt said inner header using said next-hop-destination key cryptographically linked to said destination endpoint device, while maintaining encryption of said payload portion;
    incrementally extend said data path, one-hop at a time, from said exit node to said destination endpoint device, by incorporating said next-hop onto said data path; and
    initiate transmission of said data packet along said data path, basis said fifth outer header, from said exit node to said destination endpoint device.

17. The non-transitory computer-readable storage medium as claimed in claim 15, wherein said computer-readable instructions, when executed by the computer processor, further cause the computer processor to:
  store, in an encryption server, said end-to-end key and said next-hop-destination key cryptographically linked to said destination endpoint device, and selectively render said end-to-end key and said next-hop-destination key accessible to at least one of said source endpoint device, destination endpoint device and said exit node;
  store, in said encryption server, each of said plurality of next-hop keys, and render each of said next-hop keys accessible to said corresponding intermediary nodes, in response to execution of said predetermined key distribution management scheme, on each of said plurality of intermediary nodes;
  trigger said encryption server to render a next-hop key cryptographically linked to said first intermediary node, accessible to said source endpoint device, only in an event said first intermediary node is directly coupled to said source endpoint device;
  iteratively re-encrypt said inner header using each of said next-hop keys cryptographically linked to each of said plurality of intermediary nodes selected at random for incrementally extending said data path, while maintaining encryption of said payload portion;
  trigger said source endpoint device to selectively encapsulate said header portion and said payload portion, prior to creation of said first outer header; and
  trigger said first intermediary node to decapsulate said inner header and said payload portion, prior to decryption of said inner header.

* * * * *